United States Patent
Liu et al.

(10) Patent No.: US 12,287,868 B2
(45) Date of Patent: Apr. 29, 2025

(54) SECURE EXECUTION OF A MACHINE LEARNING NETWORK

(71) Applicant: Microsoft Technology Licensing, LLC, Redmond, WA (US)

(72) Inventors: Yunxin Liu, Beijing (CN); Jiahui Hou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 17/927,854

(22) PCT Filed: May 10, 2021

(86) PCT No.: PCT/US2021/031472
§ 371 (c)(1),
(2) Date: Nov. 25, 2022

(87) PCT Pub. No.: WO2022/005616
PCT Pub. Date: Jan. 6, 2022

(65) Prior Publication Data
US 2023/0334146 A1    Oct. 19, 2023

(30) Foreign Application Priority Data
Jun. 30, 2020 (CN) .......................... 202010622376.1

(51) Int. Cl.
*G06F 21/53* (2013.01)
(52) U.S. Cl.
CPC ................... *G06F 21/53* (2013.01)
(58) Field of Classification Search
CPC ...... G06F 21/53; G06F 21/74; G06F 21/6218; G06F 21/57; G06F 21/602; G06N 3/047;
(Continued)

(56) References Cited

U.S. PATENT DOCUMENTS

2016/0350561 A1   12/2016   Poiesz
2019/0042804 A1*   2/2019   Dewan ................... G09G 5/003
(Continued)

FOREIGN PATENT DOCUMENTS

CN    107636697 A    1/2018
CN    108460460 A    8/2018
(Continued)

OTHER PUBLICATIONS

Hashmei, et al., "Darknight: A Data Privacy Scheme for Training and Inference of Deep Neural Networks," In Repository of arXiv:2006.01300v2, Oct. 15, 2020, 20 Pages.
(Continued)

*Primary Examiner* — Mohammed Waliullah
(74) *Attorney, Agent, or Firm* — Schwegman Lundberg & Woessner, P.A.

(57) ABSTRACT

According to implementations of the subject matter described herein, there is provided a solution for secure execution of a machine learning network. An operation of a first network layer of a machine learning network is executed in an uTEE of a computing device based on an input of the first network layer and a first set of modified parameter values, to obtain a first error intermediate In output. The modified parameter values are determined by modifying at least one subset of parameter values of the first network layer with first secret data. A first corrected intermediate output is determined in a TEE of the computing device by modifying the first error intermediate output at least based on the input and first secret data. A network output is determined based on the first corrected intermediate output. In this way, it is possible to protect the confidentiality of the machine learning network.

13 Claims, 5 Drawing Sheets

(58) Field of Classification Search
CPC .......... G06N 3/045; G06N 3/063; G06N 3/08; G06N 20/00; G06N 20/10
See application file for complete search history.

(56) References Cited

U.S. PATENT DOCUMENTS

| | | | |
|---|---|---|---|
| 2019/0220603 A1* | 7/2019 | Gopalakrishnan | G06F 21/64 |
| 2020/0082270 A1 | 3/2020 | Gu | |
| 2020/0167488 A1* | 5/2020 | Yitbarek | G06F 21/53 |
| 2021/0112038 A1* | 4/2021 | Karame | G06N 3/08 |
| 2021/0374234 A1* | 12/2021 | Bursell | H04L 9/085 |

FOREIGN PATENT DOCUMENTS

| | | |
|---|---|---|
| CN | 109242099 A | 1/2019 |
| CN | 109416721 A | 3/2019 |
| CN | 109670566 A | 4/2019 |
| CN | 109863497 A | 6/2019 |
| CN | 110574049 A | 12/2019 |
| CN | 110704850 A | 1/2020 |
| CN | 111260053 A | 6/2020 |
| JP | 2019121141 A | 7/2019 |

OTHER PUBLICATIONS

Office Action Received for Chinese Application No. 202010622376.1, mailed on Apr. 17, 2024, 28 pages (English Translation Provided).

Qinzhong, et al., "Research on the application of machine learning in network privacy security," Computer knowledge and technology, Issue No. 4, Feb. 5, 2020, 05 Pages.

Tramer, et al., "Slalom: Fast, Verifiable and Private Execution of Neural Networks in Trusted Hardware," In Repository of arXiv:1806.03287v1, Jun. 8, 2018, 15 Pages.

"Keras Applications", Retrieved From: https://keras.io/api/applications/, Retrieved on: Mar. 31, 2020, 4 Pages.

Abadi, et al., "TensorFlow: Large-Scale Machine Learning on Heterogeneous Distributed Systems", In Repository of arXiv:1603.04467v1, Mar. 14, 2016, 19 Pages.

Gilad-Bachrach, et al., "CryptoNets: Applying Neural Networks to Encrypted Data with High Throughput and Accuracy", In Proceedings of International Conference on Machine Learning, Jun. 19, 2016, pp. 201-210.

Bartlett, et al., "Nearly-tight VC-Dimension and Pseudodimension Bounds for Piecewise Linear Neural Networks", In Journal of Machine Learning Research, vol. 20, Issue 63, Jan. 2019, 17 Pages.

Bayerl, et al., "Offline Model Guard: Secure and Private ML on Mobile Devices", In Proceedings of Design, Automation and Test in Europe Conference, Mar. 9, 2020, pp. 460-465.

Bianchi, et al., "IoT Wearable Sensor and Deep Learning: An Integrated Approach for Personalized Human Activity Recognition in a Smart Home Environment", In IEEE Internet of Things Journal, vol. 6, Issue 5, Oct. 2019, pp. 8553-8562.

Blumer, et al., "Learnability and the Vapnik-Chervonenkis Dimension", In Journal of the ACM, vol. 36, Issue 4, Oct. 1, 1989, pp. 929-965.

Bost, et al., "Machine Learning Classification Over Encrypted Data", In Proceedings of Network and Distributed Systems Security Symposium, Feb. 8, 2015, 14 Pages.

Bulck, et al., "Foreshadow: Extracting the Keys to the Intel SGX Kingdom with Transient Out-of-Order Execution", In Proceedings of 27th USENIX Security Symposium, Aug. 15, 2018, pp. 991-1008.

Chang, et al., "A Deep Learning-Based Intelligent Medicine Recognition System for Chronic Patients", In Journal of IEEE Access, vol. 7, Apr. 2, 2019, pp. 44441-44458.

Costan, et al., "Intel SGX Explained", In Journal of IACR Cryptology ePrint Archive, 2016, pp. 1-118.

Creswell, et al., "Generative Adversarial Networks: An Overview", In Journal of IEEE Signal Processing Magazine, vol. 35, Issue 1, Jan. 9, 2018, pp. 53-65.

Deng, et al., "ImageNet: A large-Scale Hierarchical Image Database", In Proceedings of IEEE Conference on Computer Vision and Pattern Recognition, Jun. 20, 2009, pp. 248-255.

Fang, et al., "Nestdnn: Resource-Aware Multi-Tenant on-Device Deep Learning for Continuous Mobile Vision", In Proceedings of the 24th Annual International Conference on Mobile Computing and Networking, Oct. 15, 2018, pp. 115-127.

Fredrikson, et al., "Model Inversion Attacks that Exploit Confidence Information and Basic Countermeasures", In Proceedings of the 22nd ACM SIGSAC Conference on Computer and Communications Security, Oct. 12, 2015, pp. 1322-1333.

Gentry, et al., "Fully Homomorphic Encryption Using Ideal Lattices", In Proceedings of the Forty-First Annual ACM Symposium on Theory of Computing, May 31, 2009, pp. 169-178.

Gu, et al., "Yerbabuena: Securing Deep Learning Inference Data via Enclave-based Ternary Model Partitioning", In Repository of arXiv:1807.00969v2, May 16, 2019, 14 Pages.

Han, et al., "Deep Compression: Compressing Deep Neural Networks With Pruning, Trained Quantization And Huffman Coding", In Repository of arXiv:1510.00149v4, Jan. 19, 2016, 14 Pages.

Hanzlik, et al., "MLCapsule: Guarded Offline Deployment of Machine Learning as a Service", In Repository of arXiv:1808.00590v1, Aug. 1, 2018, 14 Pages.

Hashemi, et al., "Darknight: A Data Privacy Scheme for Training and Inference of Deep Neural Networks", In Repository of arXiv:2006.01300v1, Jun. 1, 2020, 12 Pages.

Jia, et al., "MemGuard: Defending against Black-Box Membership Inference Attacks via Adversarial Examples", In Proceedings of the ACM SIGSAC Conference on Computer and Communications Security, Nov. 11, 2019, pp. 259-274.

Jiang, et al., "Towards Environment Independent Device Free Human Activity Recognition", In Proceedings of the 24th Annual International Conference on Mobile Computing and Networking, Oct. 29, 2018, pp. 289-304.

Juvekar, et al., "Gazelle: A Low Latency Framework for Secure Neural Network Inference", In Proceedings of 27th USENIX Security Symposium, Aug. 15, 2018, pp. 1651-1669.

Krizhevsky, et al., "Learning Multiple Layers of Features From Tiny Images", In Publication of University of Toronto, Apr. 8, 2009, 60 Pages.

Lee, et al., "Occlumency: Privacy-preserving Remote Deep-learning Inference Using SGX", In Proceedings of 25th Annual International Conference on Mobile Computing and Networking, Oct. 21, 2019, 17 Pages.

Leino, et al., "Stolen Memories: Leveraging Model Memorization for Calibrated White-Box Membership Inference", In Repository of arXiv:1906.11798v1, Jun. 27, 2019, 16 Pages.

Li, et al., "Learning IoT in Edge: Deep Learning for the Internet of Things with Edge Computing", In Journal of IEEE Network, vol. 32, Issue 1, Jan. 26, 2018, pp. 96-101.

Li, et al., "Pruning Filters for Efficient ConvNets", In Proceedings of 5th International Conference on Learning Representations, Apr. 24, 2017, 13 Pages.

Liu, et al., "Edge Assisted Real-time Object Detection for Mobile Augmented Reality", In Proceedings of 25th Annual International Conference on Mobile Computing and Networking, Oct. 21, 2019, pp. 1-6.

Liu, et al., "Oblivious Neural Network Predictions Via Minionn Transformations", In Proceedings of the ACM SIGSAC Conference on Computer and Communications Security, Oct. 30, 2017, pp. 619-631.

Mishra, et al., "Delphi: A Cryptographic Inference Service for Neural Networks", In the Proceedings of the 29th USENIX Security Symposium, Aug. 12, 2020, pp. 2505-2522.

Mohassel, et al., "Secureml: A system for Scalable Privacy-Preserving Machine Learning", In Proceedings of IEEE Symposium on Security and Privacy, May 22, 2017, pp. 19-38.

Murdock, et al., "Plundervolt: Software-Based Fault Injection Attacks Against Intel SGX", In Proceedings of IEEE Symposium on Security and Privacy, May 18, 2020, pp. 1466-1482.

(56) References Cited

OTHER PUBLICATIONS

Nabar, et al., "A Survey of Query Auditing Techniques for Data Privacy", In Journal of Privacy-Preserving Data Mining, vol. 34, 2008, pp. 415-431.
Papernot, et al., "Semi-Supervised knowledge Transfer for Deep learning from Private Training Data", In Proceedings of the 5th International Conference on Learning Representations, Apr. 24, 2017, 16 Pages.
Wang, et al., "Leaky Cauldron on the Dark Land: Understanding Memory Side-Channel Hazards in SGX", In Proceedings of the ACM SIGSAC Conference on Computer and Communications Security, Oct. 30, 2017, pp. 2421-2434.
"International Search Report and Written Opinion Issued in PCT Application No. PCT/US21/031472", Mailed Date: Aug. 6, 2021, 12 Pages.
Hou, et al., "ML Defense: Against Prediction API Threats in Cloud-Based Machine Learning Service", In Proceedings of IEEE/ACM 27th International Symposium on Quality of Service, Jun. 24, 2019, pp. 1-10.
Rajkomar, et al., "Machine Learning in Medicine", In the New England Journal of Medicine, vol. 380, Issue 14, Apr. 4, 2019, pp. 1347-1358.
Salem, et al., "MI-Leaks: Model and Data Independent Membership Inference Attacks and Defenses on Machine Learning Models", In Network and Distributed Systems Security Symposium, Feb. 24, 2019, 15 Pages.
Salhi, et al., "Early Detection System for Gas Leakage and Fire in Smart Home Using Machine Learning", In Proceedings IEEE International Conference on Consumer Electronics, Jan. 11, 2019, pp. 1-6.
Shokri, et al., "Membership Inference Attacks Against Machine Learning Models", In IEEE Symposium on Security and Privacy, May 22, 2017, pp. 3-18.
Thoma, Martin, "Analysis and Optimization of Convolutional Neural Network Architectures", In Repository of arXiv:1707.09725v1, Jul. 31, 2017, 134 Pages.
Grover, et al., "Privado: Practical and Secure DNN Inference with Enclaves", In Repository of arXiv:1810.00602v2, Sep. 5, 2019, 18 Pages.
Tramèr, et al., "Slalom: Fast, Verifiable and Private Execution of Neural Networks in Trusted Hardware", In Proceedings of 7th International Conference on Learning Representations, May 6, 2019, 19 Pages.
Tramer, et al., "Stealing Machine Learning Models via Prediction APIs", In Proceedings of the 25th USENIX Security Symposium, Aug. 10, 2016, pp. 601-618.
Wang, et al., "In-Edge AI: Intelligentizing Mobile Edge Computing, Caching and Communication by Federated Learning", In Journal of IEEE Network, vol. 33, Issue 5, Sep. 1, 2019, pp. 156-165.
Vannostrand, et al., "Confidential Deep Learning: Executing Proprietary Models on Untrusted Devices", In Repository of arXiv:1908.10730v1, Aug. 28, 2019, 6 Pages.
Vapnik, et al., "On the Uniform Convergence of Relative Frequencies of Events to their Probabilities", In Measures of Complexity, 2015, pp. 264-280.
Xu, et al., "A First Look at Deep Learning Apps on Smartphones", In Proceedings of The World Wide Web Conference May 13, 2019, pp. 2125-2136.
Second Office Action Received for Chinese Application No. 202010622376.1, mailed on Sep. 19, 2024, 27 pages. (English Translation Provided).
Hao, et al., "System Engineering Methods and Applications," Shanghai Science Popularization Press, Nov. 30, 2016, pp. 1-5.
Third Office Action Received for Chinese Application No. 202010622376.1, mailed on Dec. 31, 2024, 28 pages. (English Translation Provided).

\* cited by examiner

SECURE EXECUTION OF A MACHINE LEARNING NETWORK

CROSS-REFERENCE TO RELATED APPLICATION

This application is a U.S. National Stage Filing under 35 U.S.C. 371 of International Patent Application Ser. No. PCT/US2021/031472, filed May 10, 2021, and published as WO 2022/005616 A1 on Jan. 6, 2022, which application claims the benefit of priority to Chinese Patent Application No. 202010622376.1, filed Jun. 30, 2020, which applications and publication are incorporated herein by reference in their entirety.

BACKGROUND

Machine learning is an artificial intelligence (AI) technology which has been continuously developed in recent years and has currently been widely used in various fields and implementations. A machine learning network may be designed to implement various tasks, including computer vision processing, speech recognition, natural language processing, and the like. With the increasing demands for machine learning-based tasks, service providers are driven to train machine learning networks with high accuracy and offer the machine learning networks to their clients as a service. Such a service may be referred to as a machine learning (ML)-as-a-Service (MLaaS). As important digital assets of the service providers, it is expected to protect the confidentiality of the well-trained machine learning network and prevent them from being stolen by malicious parties.

SUMMARY

According to implementations of the subject matter described herein, there is provided a solution for secure execution of a machine learning network. In this solution, an operation of a first network layer of a machine learning network is executed in an untrusted execution environment (uTEE) of a computing device based on an input of the first network layer and a first set of modified parameter values, to obtain a first error intermediate output. The first set of modified parameter values are determined by modifying at least one subset of a first set of parameter values of the first network layer with first secret data. A first corrected intermediate output is determined in a trusted execution environment (TEE) of the computing device by modifying the first error intermediate output at least based on the input and the first secret data. A network output of the machine learning network is determined based on the first corrected intermediate output. In this way, it is possible to protect the confidentiality of the machine learning network.

The Summary is to introduce a selection of concepts in a simplified form that are further described below in the Detailed Description. The Summary is not intended to identify key features or essential features of the subject matter described herein, nor is it intended to be used to limit the scope of the subject matter described herein.

BRIEF DESCRIPTION OF THE DRAWINGS

Throughout the drawings, the same or similar reference symbols refer to the same or similar elements.

DETAILED DESCRIPTION OF EMBODIMENTS

Figure 1:
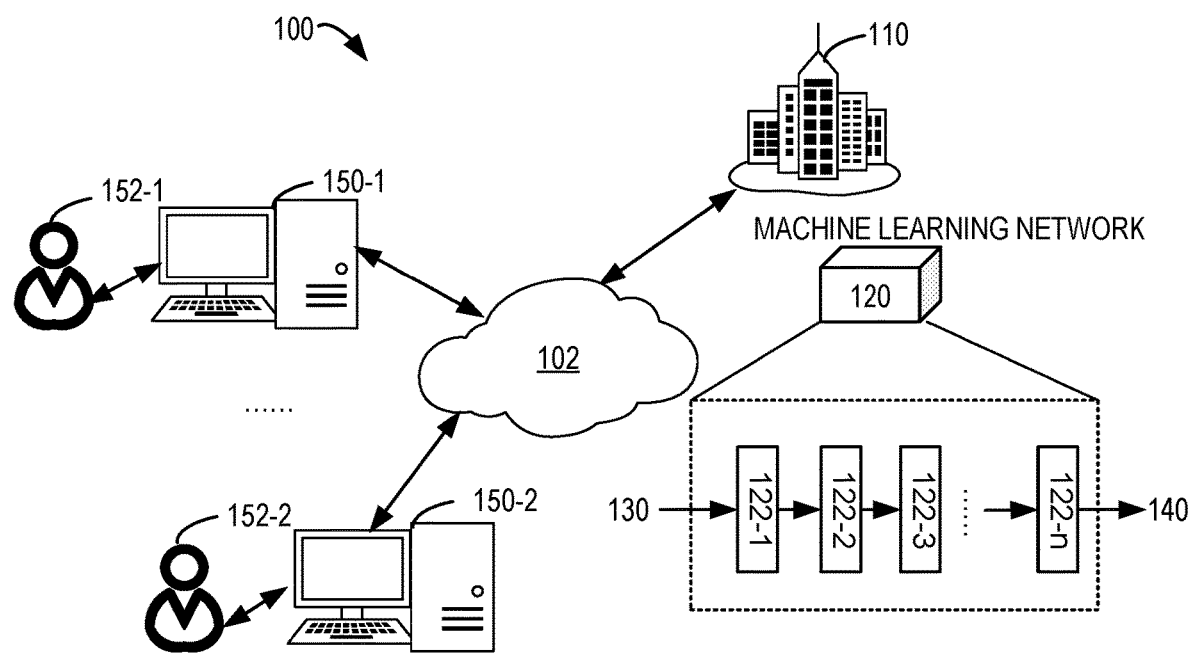
FIG. 1 illustrates a block diagram of an environment in which various implementations of the subject matter described herein can be implemented.

The subject matter described herein will now be discussed with reference to several example implementations. It should be appreciated that these implementations are illustrated only to enable those of ordinary skill in the art to better understand and therefore implement the subject matter described herein, and not to imply any limitation on the scope of the subject matter described herein.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

In the text herein, "machine learning network" may also be referred to as "machine learning model", "learning model", "learning network", "network" or "model", and the like. "Neural network" or "neural network model" is a deep machine learning network. A set of parameter values of the machine learning network is determined through training. The machine learning network uses the set of trained parameter values to map a received input to a corresponding output. Therefore, the training process of the machine learning network may be considered as learning a mapping or association between the input and the output from training data.

Generally, machine learning may include three phases, namely, a training phase, a test phase, and an application phase (also referred to as an inference phase). In the training phase, a given machine learning network may be trained iteratively using a great amount of training data until the network can obtain, from the training data, consistent inference similar to those that human intelligence can make. Through the training, the machine learning network may be regarded as being capable of learning the association between the input and the output (also referred to an input-output mapping) from the training data. The set of parameter values of the trained network is determined. In the test phase, a test input is applied to the trained model to test whether the machine learning network can provide a correct output, so as to determine the performance of the network. In the application phase, the machine learning network may be used to process an actual network input based on the set of parameter values obtained in the training and to determine the corresponding network output.

As mentioned above, machine learning has been widely used in many tasks. The accuracy of the machine learning network usually relies on a large training dataset, expert knowledge about training techniques, and the like, and the training of the machine learning network consumes a great amount of computing resources. Therefore, many users currently tend to use the ready-made trained machine learning networks. Service providers may then provide the trained machine learning networks as a service to users, thereby allowing the users to access and utilize the machine learning network. Such a service may be referred to as a machine learning (MHL)-as-a-Service (MLaaS).

FIG. 1 illustrates a block diagram of an environment 100 in which various implementations of the subject matter described herein can be implemented. In the environment 100, a service provider 110 trains a machine learning network 120. The machine learning network 120 may be a learning network capable of performing various tasks. Such tasks may, for example, include computer vision processing, speech recognition, natural language processing (NLP), and the like. Examples of the machine learning network 120 may include various Deep Neural Networks (DNN) such as Convolutional Neural Network (CNN), Recurrent Neural Network (RNN), and the like. Other examples of the machine learning network 120 may also include, but are not limited to, a Support Vector Machine (SVM), a decision tree, and a Random Forest (RF) model.

To better understand the execution of the machine learning network 120, example network architecture is first briefly described. FIG. 1 illustrates the network architecture of the machine learning network 120 as an example. The machine learning network 120 may include n network layers 122-1, 122-2, 122-3, ..., 122-n (sometimes collectively or individually referred to as network layers 122 hereunder for ease of discussion), where n is a positive integer greater than 1. Each network layer 122 includes one or more processing nodes (also referred to as neurons or filters) for performing corresponding operations to process the input of the network layer to obtain the output of the network layer. The output after the operation performed by the previous network layer 122 is used as an input of a next network layer 122. The first network layer (e.g., the network layer 122-1) in the machine learning network 120 receives a network input 130 for processing. In the text herein, an output of the network layer 122 is referred to as an intermediate output or intermediate representation (IR). The output of the last network layer (e.g., the network layer 122-n) is referred to as a network output 140.

Depending on the specific configuration of the machine learning network 120, the network layer 122 may perform various operations. Some non-limiting examples of the network layer 122 include a convolution layer for performing a convolution operation; an excitation layer for transforming the input using an excitation function such as a Rectified Linear Unit (ReLu) function, a sigmoid function, a softmax function, a tan h function, a maxout function, and the like; a pooling layer for reducing the dimensionality of the input, and the like.

Each network layer 122 of the machine learning network 120 has a set of values for parameter (referred to as a set of parameter values) for processing the input of the network layer 122. The machine learning network 120 may be represented as a mapping function, and a set of parameter values of the mapping function is a total set of parameter values of the machine learning network 120. Each network layer 122 may be represented as a sub-mapping function, and the parameter values of the sub-mapping function is a set of parameter values corresponding to the network layer 122. The mapping function of the machine learning network 120 may be identified as $F(X, W)=f_n f_{n-1} \ldots f_1(X)$, where $F( )$ represents the mapping function, W represents the total set of parameter values of the machine learning network 120, X represents the network input 130 of the machine learning network 120 having n network layers 122, and $f_i( )$ represents a sub-mapping function of the $i^{th}$ network layer 122, where $i \in [1, n]$. The set of parameter values of each network layer 122 includes weights and sometimes further includes bias parameters.

As the owner of the machine learning network 120, the service provider 110 may offer the trained machine learning network 120 to one or more users via the network 102, such as users 152-1, 152-2, and the like. The users 152-1 and 152-2 may, for example, access the machine learning network 120 through respective computing devices 150-1, 150-2, and the like. For ease of discussion, the users 152-1, 152-2, and the like are collectively or individually referred to as users 152, and computing devices 150-1, 150-2, and the like are collectively referred to as computing devices 150. A computing device 150 may, for example, be an Internet of Things (IoT) device, a client computing device, a general-purpose computer, mobile or fixed user equipment, or an edge computing device, a trusted server, or the like.

It should be appreciated that the example environment shown in FIG. 1 and the number of elements therein are all provided for the purpose of illustration. The number of computing devices and users may be more or less, and the connection relationship between them may be different in other environments.

To offer a machine learning network to users for use, a conventional solution is to deploy the machine learning network in a remote computing environment, such as a cloud environment of a service provider. The users may access the machine learning network deployed in the remote computing environment via the network. However, based on such deployment manner, the users need to upload input data to be processed from their client devices to the remote computing environment. This introduces two major issues. One of the issues is the privacy concern. The input data from the users may contain sensitive or private information, such as images, sound, health information, and the like. By uploading the input data to the remote cloud environment, the user may not have any control of the input data. The other issue is the real-time capability of data processing. The process of uploading the input data to the remote computing environment and downloading the network output processed by the machine learning network from the remote computing environment may introduce additional queuing, transmission, and propagation delays. However, even an additional 0.1 s delay may be intolerable in some latency-sensitive applications such as autonomous driving and elderly alert systems.

To alleviate the privacy concern and reduce the latency, another possible solution is to deploy the machine learning network to the user's local computing environment, such as a local client device, an edge computing device, and the like. However, from the perspective of the service provider, running the machine learning network in the local computing environment may raise another concern about revealing the confidentiality of the machine learning network. The service provider usually obtains the machine learning network by employing a large training dataset and training techniques and consuming a great amount of computing resources. Therefore, the machine learning network is an important digital asset of the service provider, and the service provider cares about preventing the confidentiality of the machine learning network from being revealed. If the configuration and the set of parameter values of the machine learning network are all provided to the local computing environments of the users, the service provider may lose control of the machine learning network, making it easier for malicious parties or attackers to steal.

To protect the confidentiality of the machine learning network running in the local computing environments of the users, a possible solution is to encrypt the user's input data and the machine learning network with advanced encryption techniques. However, the encryption and decryption requires a high computational overhead, which will increases as the complexity of the machine learning network increases. Such a solution is not suitable for local computing devices with limited computing resources. Another possible solution is to execute the machine learning network in a trusted execution environment (TEE) in a computing device. The execution within TEE may have a very high level of protection, thereby guaranteeing the security of the machine learning network. However, the inventors has found that the size of the protected memory area allocated by the TEE, i.e., the size of a Processor Reserved Memory (PRM), is limited, which disables the TEE from satisfying both security and efficiency.

The implementations of the subject matter described herein propose a solution for the secure execution of a machine learning network. The solution proposes to execute the machine learning network jointly in the untrusted execution environments (uTEE) and TEE of a computing device, thereby satisfying the performance requirements of the machine learning network in both aspects of security and efficiency. TEE and uTEE are briefly introduced before specifically describing the implementations of the subject matter described herein.

TEE is a hardware-assisted secure execution environment, also referred to as a hardware-protected enclave or secure enclave. The TEE may implement isolated execution from other parts of the computing device. Executing code in the TEE may achieve a very high level of protection, ensuring that the confidentiality and integrity of the code and data in the TEE can be protected even if the operating system, hypervisor, and basic Input/Output System (BIOS) are infected with viruses or maliciously attacked. The TEE can also defend against hardware attacks such as memory spying. Thus, external entities from the TEE, such as the hypervisor, operating system, system management modes and basic Input/Output System cannot access or tamper with the code and data in the TEE.

The TEE may be implemented in a processor of the computing device and protected by a hardware protection mechanism of the processor, in which the code and data may be executed and stored through a specific protected memory area of the processor. The data and information exchanged between the TEE and external components or devices from the TEE are all encrypted, thereby ensuring the data security. The TEE may, for example, be implemented by a Software Guard Extension (SGX) technology. Other implementations of TEE may include, for example, a secure virtual machine, a TrustedZone, a converged security engine (CSE), and the like.

In the computing device, a normal execution environment other than the TEE is referred to as an uTEE, or sometimes also referred to as a Rich Execution Environment (REE). The execution in the uTEE utilizes normal processing resources and storage resources of the computing device. As compared with the TEE, the uTEE has a lower security level and has lower resistance to attacks and malicious intrusions.

Due to its high security, the TEE may be used in applications from which privacy leakage is to be prevented. However, the inventors have found through research that there might be some performance defects if a machine learning network is directly executed in the TEE. For example, the execution speed of the machine learning network implemented in the TEE is several times lower (for example, 6.4 times lower) than the execution speed in a standard computing environment outside the TEE. The main reasons for such performance degradation may due to the following two aspects.

In one aspect, a speed of memory read/write in the TEE is slower than that of a standard execution environment outside the TEE, while the execution of the machine learning network requires massive read/write operations to the memory. The speed of the memory operation is lowered because the TEE uses a specific protected memory area, also referred to as a Processor Reserved Memory (PRM). All data in the protected memory area is encrypted by a dedicated chipset, which requires additional data encryption and decryption every time the memory is accessed.

In the other aspect, the protected memory area is usually limited, and difficult to expand as needed during runtime. For example, the protected memory area of some TEEs is set to have a size of 128 MB. Therefore, such a storage space is usually smaller than an allowable storage space needed by many machine learning networks. Although the TEE may support a larger storage space required than the protected memory area through, for example, a paging technology, this will further reduce the execution speed as the paging technology requires frequent data swap between the protected memory area and the unprotected memory area, which causes additional data encryption and decryption operations. Although it is theoretically feasible to increase the protected memory area of the TEE, usually the size of the protected memory area is a value that is set carefully in engineering and is difficult to be modified. In addition, increasing the size of the protected memory area of the TEE will also reduce the storage space available in the computing device for other standard applications that do not require storage protection.

Considering the storage space limitations and constraints on storage access, the inventors have found that completely executing the machine learning network within the TEE will result in a large time overhead. Such performance constraints and capacity constraints make it not a preferred solution to completely execute the machine learning network within the TEE. On the other hand, due to the low security in the uTEE, it may be impossible to guarantee the security of the machine learning network if the machine learning network is executed within the uTEE.

Therefore, according to some implementations of the subject matter described herein, an improved solution for secure execution of a machine learning network is proposed. Specifically, at least a portion of the machine learning network, including includes one or more network layers, is executed in an uTEE of a computing device. Parameter values of at least one network layer executed in the uTEE are modified with secret data, so the correct parameter values cannot be obtained from the uTEE. Since the parameter values are modified, an intermediate output of a network layer obtained in the uTEE is also considered as being modified, and referred to as an error intermediate output. The secret data is provided in the TEE. The computing device uses the secret data in the TEE to correct the error intermediate output generated in the uTEE and obtain a corrected intermediate output to determine a network output of the machine learning network. Since the correct intermediate output of the network layer may always be recovered in the TEE, it is possible to ensure that the network output is correct.

Through the above solution, by completing the execution of the machine learning network through collaboration of the TEE and uTEE and modifying the parameter values of the network portion executed in the uTEE, it is possible to protect the confidentiality of the machine learning network and prevent malicious parties from stealing confidential information of the machine learning network, such as parameter values and intermediate outputs. Since it is not required to execute the entire machine learning network in the TEE, the storage space and computing resources of the TEE may not be highly consumed, thereby achieving the efficiency of the overall execution may be ensured.

The basic principles and several example implementations of the subject matter described herein are described below with reference to the figures.

Figure 2:
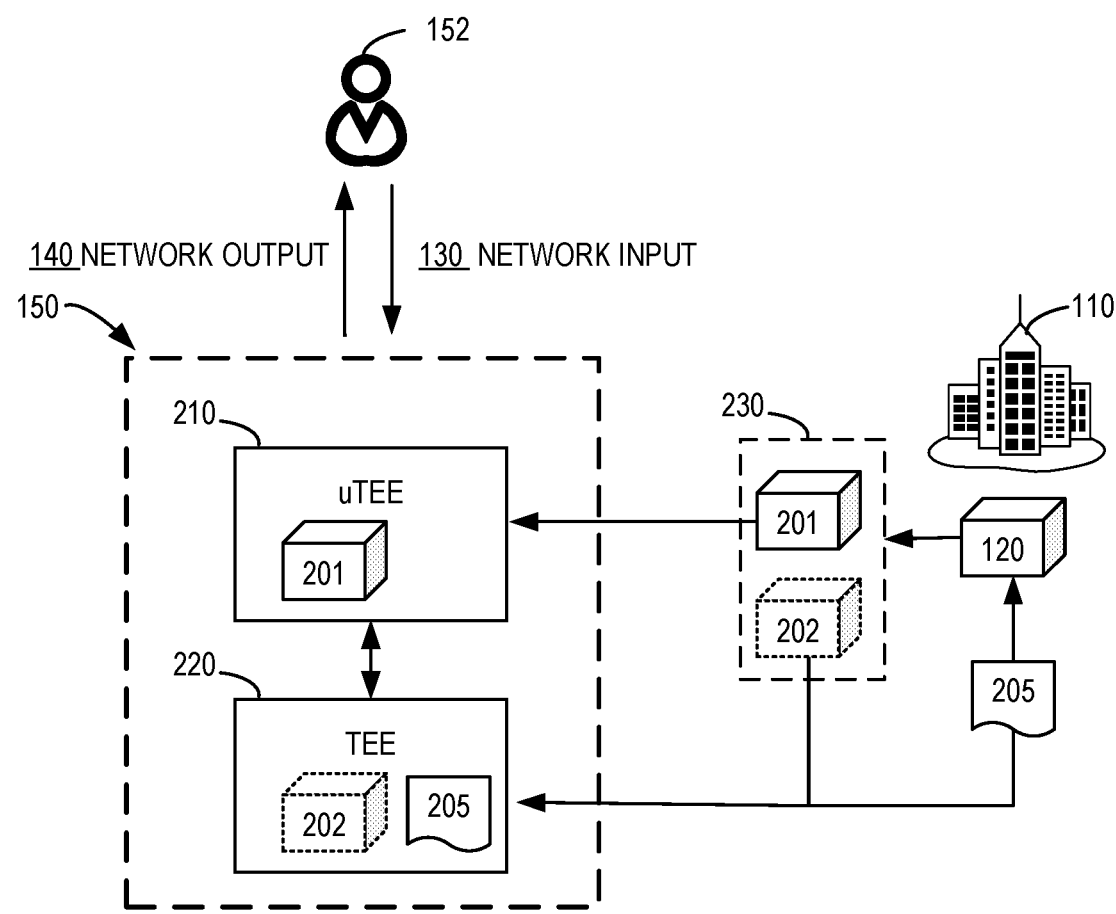
FIG. 2 illustrates a schematic block diagram of a computing environment implemented in a computing device according to some implementations of the subject matter described herein.

Reference is first made to FIG. 2, which illustrates a schematic block diagram of a computing environment implemented in a computing device according to some implementations of the subject matter described herein. For ease of discussion, the description will be discussed with reference to FIG. 1. In the implementations of the subject matter described herein, the machine learning network 120 of the service provider 110 is deployed to the computing device 150 locally for execution. Since the machine learning network 120 is run locally at the computing device 150, the privacy of input data of the user 152 and the output result generated by the machine learning network can be protected, and the communication latency is also improved as compared to the solution in which the machine learning network is executed in a remote computing environment.

The machine learning network 120 deployed to the computing device 150 may be a trained machine learning network, and a set of parameter values of this network has been determined. As shown schematically in FIG. 1, the machine learning network 120 includes a plurality of network layers 122, each having one or more processing nodes to be executed to perform corresponding operations.

By deploying the trained machine learning network to the user's computing device, it is expected to ensure the confidentiality of the machine learning network and prevent the machine learning network from being stolen by malicious parties or attackers. Usually, at least the network architecture of the machine learning network and the set of trained parameter values are required in order to steal the trained machine learning network or a machine learning network with equivalent training performance. As compared with the network architecture, the set of trained parameter values are more confidential information. Even if the malicious party has stolen the network architecture of the machine learning network, such as types of network layers, the number of network layers, the connection relationship between the network layers, the number of processing nodes in each network layer, and the like, it is difficult for them to obtain a good-performance machine learning network by training the architecture. This is because other information that affects the accuracy of the machine learning network, such as training data, training parameters (e.g., the learning rate, the batch size, and the mini-batch size), network hyperparameters, and the like, cannot be easily obtained by the malicious party. Without such information, the malicious party cannot determine the set of parameter values of the machine learning network through training, and thus cannot obtain a machine learning network equivalent to that provided by the service provider.

The solution for protecting the confidentiality of the machine learning network proposed in the subject matter described herein is based on the inventors' important discovery as follows: the accuracy of the machine learning network will be significantly reduced even if a small portion but not all of the parameter values of the machine learning network are modified. For example, the inventors found that for some trained machine learning networks, if only about 10% of the parameter values in the network are replaced with random values, this machine learning network executed with the modified parameter values may have about 25% or more of accuracy drop. Due to such performance degradation, it is difficult to obtain a machine learning network with equivalent performance even if the modified parameter values are leaked out.

At least based on the above discovery, in the implementations of the subject matter described herein, to protect the confidentiality of the machine learning network 120, before the machine learning network 120 is deployed to the computing device 150, the set of parameter values of at least one network layer 122 of the machine learning network 120 is modified with secret data 205 to obtain a secure version 230 of the machine learning network 120. Such modification prevents a malicious party from deriving the correct parameter values of this/these network layers 122. Therefore, this portion of network layers 122 may be deployed in a less secure execution environment in the computing device 150, for example, in the uTEE 210 for execution.

In addition, a trusted entity, namely, the TEE 220 may be run in the computing device 150, and its internal data and code are inaccessible to the malicious party. Therefore, the secret data 205 is provided to the TEE 220, for example, is stored in a protected memory area of the TEE 220. The secret data 205 is used to correct an error intermediate output generated by the network layer(s) 122 executed in the uTEE 210 in the TEE 220 to ensure that a final correct network output can be obtained. How to use the secret data 205 to correct the error intermediate output in the TEE 220 will be discussed in detail below.

The TEE 220 is a hardware-assisted secure execution environment that can provide an attack surface (e.g., a processor boundary) which is as small as possible. The TEE 220 may be implemented in the processor of the computing device 150, and a hardware protection mechanism of the processor provides code and data protection. A protected memory area is also allocated to the TEE 220. The protected memory area may not be accessed by operations of a non-TEE (for example, the uTEE 210), including a Direct Memory Access (DMA) from a peripheral device. The uTEE 210 may include an execution environment other than the TEE in the computing device 150, for example, include a normal execution environment. As compared with the TEE 220, uTEE 210 has less security.

In some implementations, in generating the secure version 230, one or more network layers 122 of the machine learning network 120 may further be deployed to the TEE 220 for execution, and the set of parameter values of these network layers 122 are not modified. The secure version 230 of the machine learning network 120 includes a network portion 201 and a network portion 202, depending on whether the execution environment in the computing device 150 is the uTEE 210 or the TEE 220. The network portion 201 is loaded into the uTEE 210 of the computing device 150 for execution. The network portion 202 of the machine learning network 120 is loaded into the TEE 220 of the computing device 150 for execution.

The network portion 201 includes one or more network layers 122 of the machine learning network 120, and the network portion 202 includes one or more further network layers 122 of the machine learning network 120. As mentioned above, in the network portion 201 executed in the uTEE 210, the set of parameter values of at least one network layer 122 are modified with the secret data 205. The set of parameter values of the network layers 122 in the network portion 202 may not be modified. In some implementations, the network portion 201 or the network portion 202 may include a plurality of sequential network layers 122, or a network layer 122 included in one execution environment may be directly connected to a network layer 122 executed in the other execution environment. Dividing the network layers 122 into the network portion 201 and the network portion 202 may be based on one or more aspects of computational overhead, storage requirements of parameter values, impacts on the accuracy of the machine learning network 120, and the like, which will be described in detail below.

Herein, a "set of parameter values" of the network layer 122 refers to a set of parameter values of the network layer 122 obtained after the machine learning network 120 has been trained, and is also call "a set of correct parameter values" or "a set of trained parameter values". The sets of trained parameter values of all network layers 122 may be used to determine the correct network output 140 for the network input 130 of the machine learning network 120. To protect the confidentiality of the machine learning network 120, the focus is to protect the sets of parameter values of the machine learning network 120 from being leaked. Therefore, a set of parameter values of a network layer 122 is also referred to as a "set of protected parameter values". Herein, the "set of parameter values" of the network layer 122 obtained after the modification or scrambling with the secret data 205 is referred to as "a set of modified parameter values" or "a set of scrambled parameter values" of the network layer 122.

Since the set of parameter values of at least one network layer 122 of the network portion 201 is modified, to obtain the correct network output, the secret data 205 is also provided in the TEE 220, for example, stored in the protected memory area of the TEE 220. As will be discussed in detail below, the secret data 205 is used in the TEE 220 to correct the error intermediate output generated by the network layer(s) 122 in the uTEE 210 whose parameter values are modified.

In some implementations, an owner of the machine learning network 120, such as the service provider 110, may determine the parameter values to be modified in the machine learning network 120 and the network layers 122 to be loaded into the uTEE 210 and the TEE 220. Some specific examples regarding the parameter values to be modified and the network layers 122 deployed in the uTEE 210 and the TEE 220 will be provided below.

Specifically, in some implementations, the network layer(s) 122 to be deployed in the uTEE 210 and the network layer(s) 122 to be deployed in the TEE 220 may be determined based on the computational overheads of the network layers 122. In an implementation, one or more network layers 122 that require a large amount of computing resources (for example, exceeding a resource threshold) may be deployed to the uTEE 210 for execution. In one implementation, one or more network layers 122 that require a small amount of computing resources (for example, below the resource threshold) may be deployed to the TEE 220 for execution. In some implementations, the network layer(s) 122 that cannot be deployed in the TEE 220 due to the resource constraint may be deployed in the uTEE 210. The amount of computing resources here refers to an amount of processing resources and/or storage resources (the storage space for storing intermediate results generated during execution) that are needed to provide certain processing efficiency during the execution of a network layer 122. As an example, in CNN, the operations of convolutional layers are main operations for the CNN, and execution of a convolutional layer requires a large amount of computing resources. Thus, one or more convolutional layers may be deployed to the uTEE 210 for execution. As another example, in CNN or other types of machine learning networks, an excitation layer usually uses an excitation function to perform linear or non-linear transformation on the input of this layer and requires a small amount of calculation. Thus, one or more excitation layers may be deployed to the TEE 220.

In addition to or as an alternative to the amount of computing resources, in some implementations, deploying a network layer 122 to either the uTEE 210 or the TEE220 may also be based on one or more aspects of the storage amount of the parameter values. In an implementation, a network layer 122 with a larger storage amount of parameter values (e.g., greater than a storage threshold), for example, a network layer 122 with a large number of parameter values, may be deployed in the uTEE 210. In one implementation, a network layer 122 with a small storage amount of parameter values (e.g., smaller than the storage threshold), for example, a network layer 122 with a small number of parameter values, may be deployed in the TEE 220. In some implementations, the network layers 122 that cannot be deployed in the TEE 220 due to the storage constraint may be deployed in the uTEE 210. As an example, network layers such as convolutional layers and fully-connected layers have a large number of parameter values. Therefore, if the machine learning network 120 includes network layers such as the convolutional layers and the fully-connected layers, these network layers may be deployed in the uTEE 210. A network layer such as an excitation layer with a small number of parameter values may be deployed in the TEE 220.

Since the correct parameter values of the network layers 122 are utilized in the TEE 220 to process the input of the network layers 122, the intermediate output of one or some network layers 122 may further be transferred to the uTEE 210 for further processing. In some implementations, to increase the difficulty of deriving the parameter values of the network layer from the correct intermediate output, one or more network layers 122 that perform nonlinear transformation may be deployed in the TEE 220. For example, an excitation layer that performs nonlinear transformation may be deployed in the TEE 220. Examples of the excitation layers that perform nonlinear transformation may include, but are not limited to, excitation layers using nonlinear excitation functions, such as ReLu, sigmoid, softmax, tan h, or maxout. In some implementations, in order to reduce the computational complexity of correcting the intermediate outputs in the TEE 220, one or more network layers 122 that perform linear transformation may be deployed in the uTEE 210, and the sets of parameter values of the network layers 122 that perform linear transformation are modified.

In the implementations of the subject matter described herein, as mentioned above, a part of the parameter values of the machine learning network 120 are modified with the secret data 205, such that the user of the computing device 150 cannot acquire the correct parameter values. With such parameter value modification, to obtain the correct processing result, i.e., the correct network output 140, the intermediate outputs from the network layers 122 with its parameter values modified may be corrected with the secret data 205 in the TEE 220. Due to the limited storage space and processing resources of the TEE 220, if all of the parameter values of the machine learning network 120 are modified, even if the whole machine learning network 120 is executed outside the TEE 220 (e.g., in the uTEE 210), the correction process performed in the TEE 220 may also take a lot of time to obtain the correct network output 140. The overhead caused may be similar to the overhead of a process of directly executing the machine learning network 120 in the TEE 220 using the set of correct parameter values. Therefore, in some implementations, only part of the network layers 122 are deployed in the uTEE 210, with their sets of parameter values modified.

In some implementations, it is desirable to deploy as many network layers 122 as possible in the uTEE 210, and deploy as few network layers 122 as possible in the TEE 210 in order to avoid reducing the execution efficiency in the TEE 210. Since many network layers 122 are deployed in the uTEE 210, in some implementations, partial parameter values of the network 122 deployed in the uTEE 210 may be modified to reduce the computational overhead in correcting the error intermediate outputs in the TEE 220, which can further improve the overall execution efficiency of the machine learning network. As mentioned above, the inventors discovered that even if a small portion but not all of the parameter values of the machine learning network are modified, the accuracy of the machine learning network will be significantly reduced. This makes it impossible for malicious parties to derive a machine learning network with equivalent performance even if the set of modified parameter values is stolen.

In some implementations, modifying a set of parameter values of a network layer 122 with secret data 205 may be considered as applying random values (also referred to as noise) to the parameter values of at least one subset of the set of parameter values. Therefore, the secret data 205 may also be referred to as noise data or disturbance data.

If the number of modified parameter values in the machine learning network 120 is small, the amount of the secret data 205 will also be reduced, which may also save the space of the protected memory area required for storing the secret data 205 in the TEE 220. In some implementations, if a set of parameter values of some network layer 122 are to be modified, a subset but not all of the set of parameter values are modified. This may further reduce the size of the secret data 205, thereby further reducing the occupation of the protected storage space of the TEE 220. Certainly, in some applications, all parameter values of one or more network layers 122 may be modified.

In some implementations, which network layers 122 and/or which parameter values in the set of parameter values of the network layers 122 are to be modified are determined based on one or more aspects of their contributions to the machine learning network 120. In some implementations, for a network layer 122 to be modified (for example, the network layers 122-1, 122-3 to be deployed in the uTEE 210), a contribution made by the subset of modified parameter values to the machine learning network 120 is greater than a contribution made by other parameter values in the set. The contribution of a parameter value or a group of parameter values to the machine learning network 120 refers to a degree to which the change of the parameter value or the group of parameter values affects the accuracy performance of the machine learning network 120. If a tiny change of a parameter value(s) may result in an accuracy decrease of the network output of the machine learning network, the contribution of this parameter value(s) is high, and the parameter value(s) is "important" to the machine learning network 120. Otherwise, the contribution of the parameter value(s) is low. Modifying the important parameter values with large contributions may cause the accuracy of the secure version 230 of the machine learning network 120 reduced to a more intolerable level, and make it difficult for the machine learning network 120 to be retrained.

There are various manners that can be employed to determine contributions of parameter values to the machine learning network 120. In some implementations, contributions of parameter values of a network layer 120 to the machine learning network 120 may be determined based on a model pruning technique. The model pruning technique is usually used to determine unimportant parameter values in a machine learning network. The purpose is to prune the network layer connections corresponding to unimportant parameter values from the machine learning network, to achieve the compression of the network. Therefore, the model pruning technique may be utilized to filter out unimportant parameter values. By using the model pruning technique, it may be possible to determine the parameter values in a network layer 122 which are difficult to be filtered out, and these parameter values are considered as having higher contributions to the machine learning network 120. In some implementations, larger parameter values in the set of parameter values of the network layer 122 may be determined to be modified because larger parameter values generally have greater impacts on the performance of the machine learning network 120 and thus have higher contributions. As such, in a set of parameter values of a network layer 122, parameter values in the modified subset are greater than other parameter values in the set of parameter values.

In some implementations, to deploy the secure version 230 of the machine learning network 120 (including the network portions 201 and 202) in the computing device 150, it is expected that one or more of the following objectives can be met: (1) the accuracy of the machine learning network 120 will not change significantly; (2) the modified parameter values are difficult to identified, that is, it is difficult for a malicious party to discover which parameter values are modified and which parameter values are correct; (3) the machine learning network 120 is difficult to rebuild, that is, the difficulty of obtaining the machine learning network 120 through retraining is greater or substantially the same as training the machine learning network 120 from scratch. In some implementations, one or more of the above goals may be achieved by configuring the secret data 205.

In an implementation, the secret data 205 may be determined such that a distribution of parameter values in the set of modified parameter values of a network layer 122 is substantially the same as a distribution of parameter values in the original set of parameter values of the network layer 122. That is to say, for a network layer 122, the distribution of parameter values is the same before and after being modified with the secret data 205. It is assumed that the secret data 205 is used to modify p % of parameter values in a set of parameter values of a certain network layer 122. The modified parameter values may still follow the distribution of the remaining (1-$p$)% parameter values in the set of parameter values. Therefore, the distribution of the whole set of correct parameter values of the network layer 122 is substantially the same as the distribution of the set of modified parameter values. This may prevent the malicious party from perceiving that the parameter values have been modified through the distribution, and in turn make it difficult for the malicious party to obtain the machine learning network 120 through retraining. In addition, the accuracy of the machine learning network with the modified parameter values may be further reduced by placing the constraint on the distribution of parameter values before and after the modification.

Specifically, a distribution of a set of correct parameter values of a network layer 122 may be determined first. After the parameter values to be modified in the set of parameter values (for example, the parameter values with large contributions) are determined, it is determined that the secret data used for modifying those parameter values can meet the requirement for the distribution. It has discovered from statistics that distributions of parameter values of many network layers, especially the parameter values of the convolutional layers, are substantially symmetrical, and sometimes symmetrical with respect to a value near zero. Therefore, it may be easy to achieve the requirement for the distribution. In some implementations, if it is determined that the distribution of the set of correct parameter values of the network layer 122 satisfies a symmetric distribution, some parameter values (represented as $r'_i$) may be randomly sampled from the distribution of the set of parameter values of a network layer i. The number of sampled parameter values is the same as the number of parameter values to be modified. The secret data (represented as $r_i$) used to modify the set of parameter values of the network layer may be determined as $-W_i + r'_i$, where $W_i$ represents the set of parameter values of the network layer 122.

In some implementations, for a certain network layer 122, if the distribution of its set of parameter values is asymmetric or is not uni-modal, other techniques may also be leveraged to match the distribution of the set of parameter values. In one implementation, a Generative Adversarial Network (GAN) may be used to generate a new set of parameter values, so that the generated new set of parameter values has substantially the same distribution as the set of parameter values of a network layer 122 input to the GAN. The new set of parameter values generated by the GAN may be determined as the set of modified parameter values of that network layer 122. A difference between the set of modified parameter values and the set of correct parameter values of the network layer 122 is determined as their corresponding secret data 205. The GAN usually includes a generator network and a discriminator network. The generator network may be configured to generate, based on the set of correct parameter values of the network layer 122, a new set of parameter values that simulates the set of correct parameter values. The discriminator network may be configured to determine whether the generated new set of parameter values has the same distribution as the set of correct parameter values.

Some example implementations for determining the set of parameter values with the same distribution are presented above. It should be appreciated that the set of modified parameter values of the network layer and the corresponding secret data may also be determined in other ways. After the parameter values are modified and the secret data are determined, the service provider 110 may provide the secure version 230 of the machine learning network 120 and the secret data 205 to the computing device 150. The computing device 150 may execute the machine learning network 120 in the uTEE 210 and TEE 220 to process the network input 130 of the user 152 and provide the corresponding network output 140.

In some implementations, the service provider 110 configure a plurality of secure versions of the machine learning network 120, and in each secure version, the secret data used may be different or the splitting of the network layers 122 into the network portions 201 and 202 may be different. These different secure versions may be deployed to computing devices 150 of the different users 152. This may further reduce the possibility of leakage of the confidentiality of the machine learning network 120 of the service provider 110.

Figure 3:
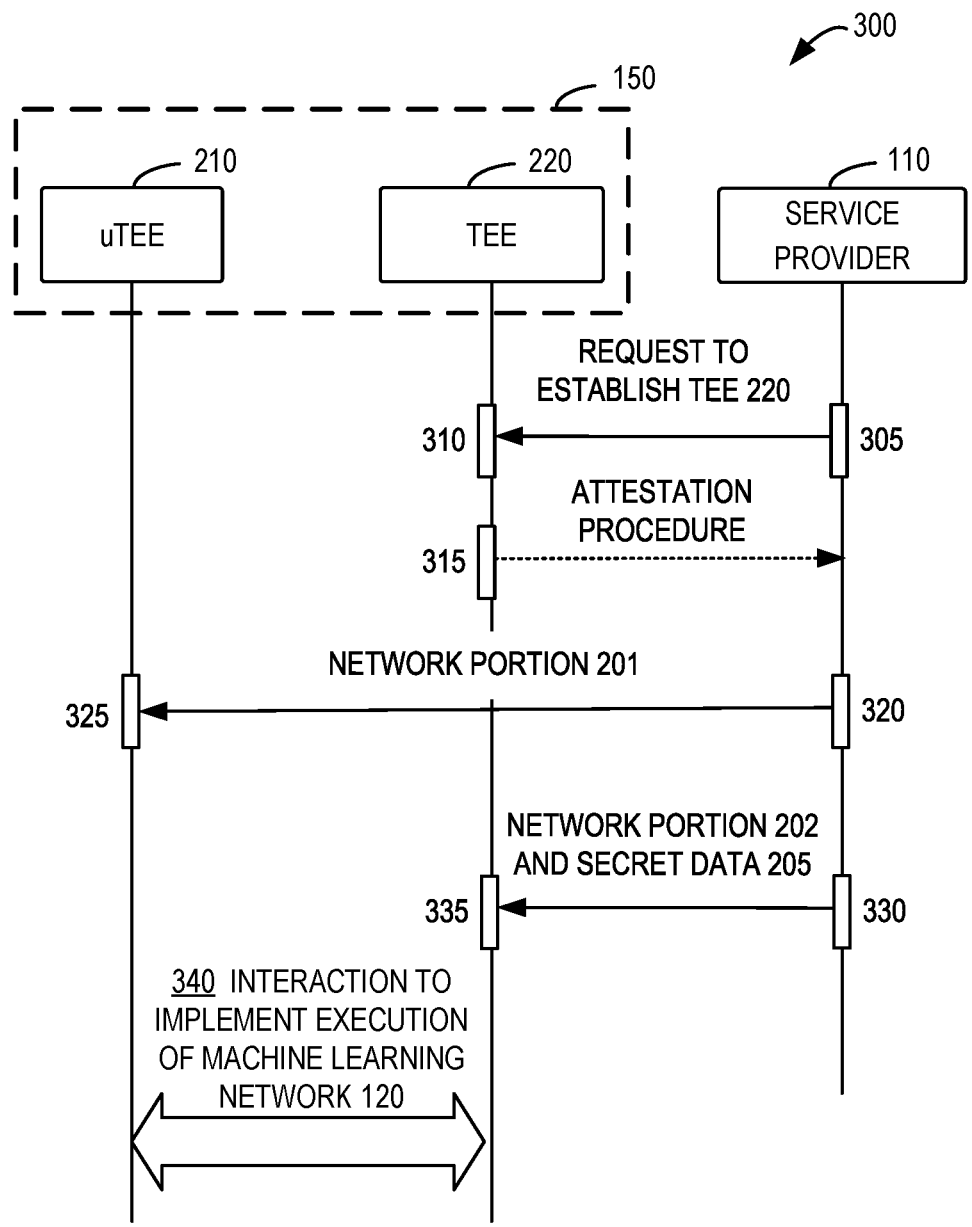
FIG. 3 illustrates a diagram showing signaling interaction between various entities according to some implementations of the subject matter described herein.

FIG. 3 illustrates a diagram 300 showing signaling interaction between various entities according to some implementations of the subject matter described herein. The service provider 110, which is, for example, a control entity such as a server or a computing system, sends 305 a request to establish the TEE 220 to the computing device 150. The service provider 110 may, for example, provide the computing device 150 with information needed to establish the TEE 220, such as corresponding program code. After the computing device 150 receives 310 the request from the service provider 110, the TEE 220 is established in the computing device 150. In some implementations, to ensure that the TEE 220 is loaded on the computing device 150 and runs correctly, optionally, the TEE 220 also initiates 315 an attestation procedure with the service provider 110. In one implementation, the TEE 220 may determine a digital digest in an initial state, such as a hash value, and provide the digital digest to the service provider 110 to complete the attestation procedure.

In some implementations, the machine learning network 120 may be provided as an executable application in the computing device 150. Correspondingly, the service provider 110 may also provide the computing device 150 with the program code of the application. The program code may be run in a normal execution environment of the computing device 150, such as uTEE 210.

After the attestation, the service provider 110 provides the secure version 230 of the machine learning network 120 to the computing device 150. Specifically, if the secure version 230 includes the network portion 201 to be deployed in a uTEE and the network portion 203 to be deployed in a TEE, the service provider 110 provides 320 the network portion 201 to the computing device 150 so that the network portion 201 is loaded 325 to the uTEE 210 of the computing device 150. The service provider 110 also provides 330 the network portion 202 of the machine learning network 120 and the secret data 205 in the secure version 230 to the computing device 150. The network portion 202 and the secret data 205 are loaded 335 into the TEE 220 of the computing device 150. The computing device 150 decrypts the network portion 202 and the secret data 205 within the TEE 220. No other processes in the computing device 150 may have access to the network portion 202 and the secret data 205 in the TEE 220.

If execution of the machine learning network 120 is triggered in the computing device 150, for example, when the network input 130 of the machine learning network 120 is received, the network portion 201 and the network portion 202 are executed in the uTEE 210 and the TEE 220, respectively. During the execution, the uTEE 210 and the TEE 220 interact 340 with each other to implement secure execution of the machine learning network 120 and obtain the network output 140 of the machine learning network 120.

Figure 4:
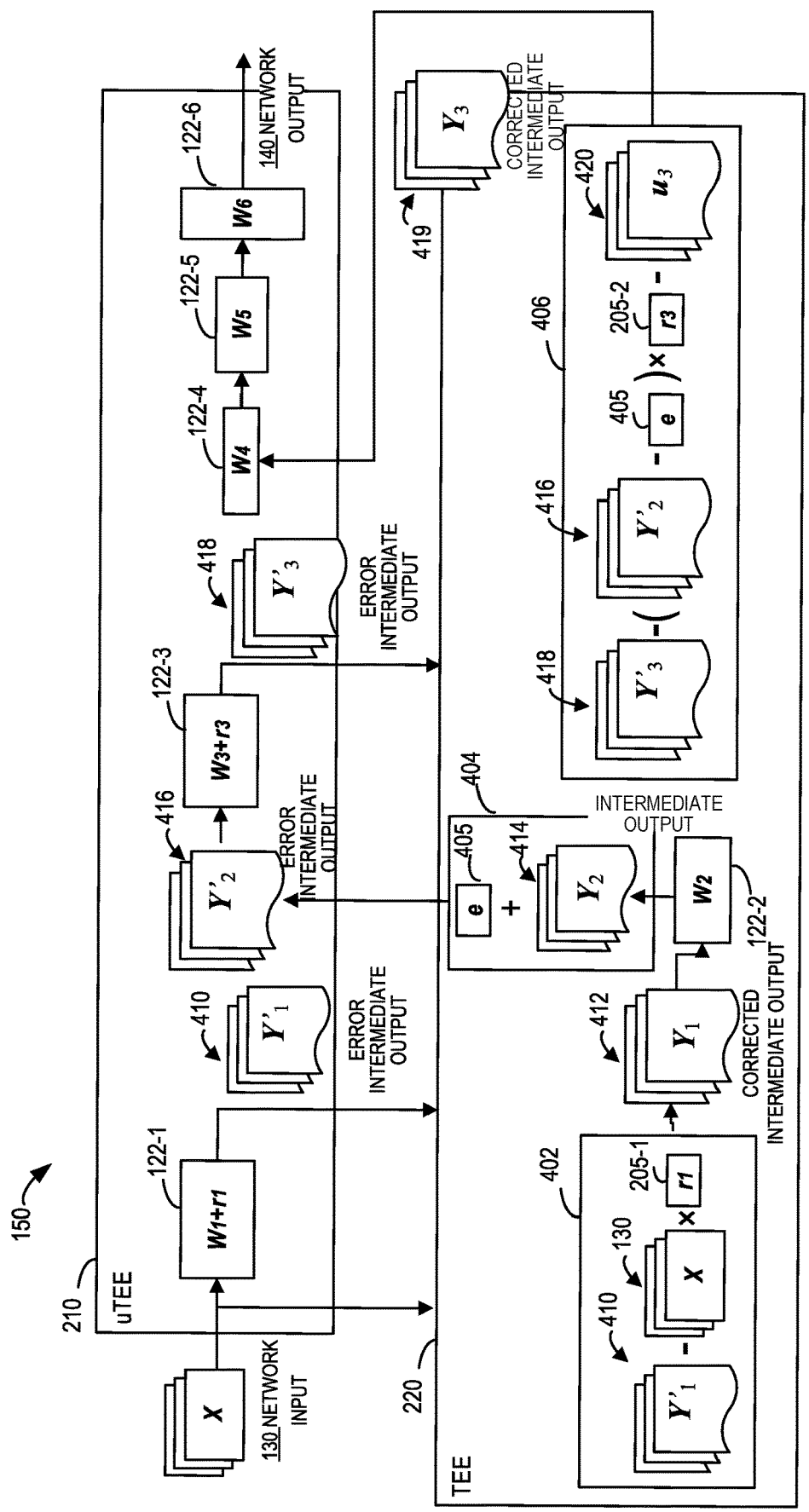
FIG. 4 illustrates a schematic block diagram of a machine learning network executed in an execution environment of a computing device according to some implementations of the subject matter described herein.

The deployment and execution of the machine learning network 120 in the uTEE 210 and the TEE 220 will be described in more detail below with reference to FIG. 4. It should be appreciated that FIG. 4 is only a specific example of the distributed deployment of the machine learning network 120 across the uTEE 210 and the TEE 220. The subject matter described herein further covers many other alternative deployments, some alternative deployments are explicitly mentioned herein, and some deployments are equivalent variants that can be conceived with the teachings of the subject matter described herein.

In the example of FIG. 4, it is assumed that the machine learning network 120 includes the network layers 122-1 to 122-6. As shown, the network layers 122-1, 122-3, 122-4, 122-5, and 122-6 of the machine learning network 120 are deployed in the uTEE 210, and these network layers 122 form the network portion 201. The network layer 122-2 is deployed in the TEE 220, and forms the network portion 202.

Among the plurality of network layers 122 executed in the uTEE 210, it is assumed that the sets of parameter values of network layers 122-1 and 122-3 are modified. Specifically, the set of correct parameter values of the network layer 122-1 is represented as $W_1$, and includes one or more parameter values. The set $W_1$ of parameter values of the network layer 122-1 is modified with secret data 205-1 (represented as $r_1$), to obtain a set of the modified parameter values of the network layer 122-1 (represented as $r'_1 = W_1 + r_1$). The set of correct parameter values of the network layer 122-3 is represented as $W_3$, and includes one or more parameter values. The set $W_3$ of parameter values of the network layer 122-3 is modified with secret data 205-2 (represented as $r_3$) to obtain the set of modified parameter values of the network layer 122-1 (represented as $r'_3 = W_3 + r_3$). Correspondingly, for the network layer 122-1, the corresponding secret data 205-1 $r_1$ may be expressed as $-W_1 + r'_1$; for the network layer 122-3, and the corresponding secret data 205-2 $r_3$ may be represented as $-W_3 + r'_3$. The secret data 205-1 and 205-2 are included in the secret data 205. The secret data used to modify the sets of parameter values of different network layers may be the same or different.

In the example of FIG. 4, the sets of parameter values of other network layers of the machine learning network 120 including the network layer 122-2 deployed in the TEE 220 and other network layers 122-4 to 122-6 deployed in the uTEE 210 may not be modified, and are represented as $W_2$, $W_4$, $W_5$ and $W_6$ in the figure, respectively.

In some implementations, the network layers 122-1 and/or 122-3 whose parameter values are modified may include convolutional layers because convolution operations of the convolutional layers require a large computational overhead and a large number of parameter values. In some implementations, the network layer 122-2 deployed in the TEE 220 is a network layer that may perform non-linear transformation and/or with a small number of parameter values or a small computing overhead. For example, the network layer 122-2 may be an excitation layer deployed between the two network layers 122-1 and 122-3 operating as convolutional layers, and the excitation function employed at the excitation layer is a nonlinear transformation function.

After receiving the network input 130, the computing device 150 is triggered to execute the machine learning network 120. Although the network architecture is divided into two portions which are deployed in the uTEE 210 and the TEE 220, respectively, during execution, the operations of the respective network layers 122 of the machine learning network 120 are performed according to the execution order of the network layers 122 in the machine learning network 120. After the operation of a current network layer 122 is completed in one execution environment of the uTEE 210 and the TEE 220, if the next network layer 122 is in the other execution environment of the uTEE 210 and the TEE 220, the intermediate output of this current network layer 122 is transferred to the other execution environment for following processing.

Herein, if a certain network layer 122 has a set of modified parameter values, the intermediate output obtained after performing the operation of this network layer 122 is referred to as an "error intermediate output". In addition, if an input provided to a certain network layer 122 is the error intermediate output from the previous network layer 122, the intermediate output obtained after the operation of the certain network layer 122 is also referred to as an "error intermediate output" even if the set of parameter values of the certain network layer 122 is correct. The "error intermediate output" here is used with respect to the intermediate output of the corresponding network layer 122 when the machine learning network 120 is executed with the normal correct parameter values. The "error intermediate output" is incorrect and cannot be directly used to generate the correct network output 140. The correction of the error intermediate output may be performed in the TEE 220 to obtain the corrected intermediate output for use.

In some implementations, if the network layer 122 is executed in the TEE 220, the error correction intermediate output may be used to ensure that the input provided to the network layer 122 is the corrected intermediate output of the previous network layer. In some implementations, the correction performed in the TEE 220 may further be used to ensure that the input provided to the last network layer 122 of the machine learning network 120 is correct, or to correct the error intermediate output of the last network layer 122 in the TEE 220 so as to obtain the corrected intermediate output as the final network output. The execution of the correction in the TEE 220 depends on the deployment of respective network layers 122 in the uTEE 210 and the TEE 220. Hereinafter, illustration will be presented with reference to the specific example shown in FIG. 4.

Specifically, in execution of the machine learning network 120, the network input 130 (represented as X) is provided to the first network layer 122 of the machine learning network 120 for processing. In FIG. 4, the first network layer 122-1 is deployed in the uTEE 210, so the network input 130 is provided to the network layer 122-1 in the uTEE 210 as its input. In the uTEE 210, the operation of the network layer 122-1 is executed based on the input of the network layer 122-1 (i.e., the network input 130) and the set of modified parameter values $W_1 + r_1$, to obtain an error intermediate output 410.

Since the next network layer 122-2 after the network layer 122-1 is deployed in the TEE 220, the error intermediate output 410 is transferred from the uTEE 210 to the TEE 220. In other examples, a plurality of continuous network layers 122 of the machine learning network 120 may be deployed in the uTEE 210, where the set of parameter values of at least one network layer 122 are modified. For example, if there may be one or more other network layers 122 between the network layers 122-1 and 122-2 and these network layers 122 may be deployed in the uTEE 210, other network layers 122 may continue to be executed in the uTEE 210 after the error intermediate output 410 is obtained. Due to the error transmission of the error intermediate output 410, even if the sets of parameter values of other network layers 122 are not modified, the intermediate output generated by the network layer 122 preceding the network layer 122-2 still be error, and thus is also considered as an error intermediate output.

In FIG. 4, the computing device 150 corrects the error intermediate output 410 in the TEE 220. Specifically, the TEE 220 includes a correction module 402 which is configured to modify the error intermediate output 410 at least based on the input of the network layer 122-1 (i.e., the network input 130) and the secret data 205-1 for generating the set of modified parameter values $W_1+r_1$, to obtain the corrected intermediate output 412 of the network layer 122-1. In order to perform the correction, the network input 130 is also copied to the TEE 220 for use. If the error intermediate output 410 is provided to the TEE 220 after the operations of the plurality of network layers 122 are executed in the uTEE 210, the sets of parameter values used when these network layers 122 are executed (regardless of whether they are modified with secret data or not) are all provided to the TEE 220 for use in the corrected error intermediate output 410. These sets of parameter values may be stored in the protected memory area of the TEE 220 before the machine learning network 120 is executed.

The corrected intermediate output 412 may be determined to be the same as the correct intermediate output obtained by performing the operation of the network layer 122-1 using the set of correct parameter values $W_1$ of the network layer 122-1 and the network input 130. In correcting the error intermediate output 410, the secret data 205-1 $r_1$ that is additionally added for interfering the set of parameter values may be used together with the network input 130 to determine the error data, and the corrected intermediate output 412 may be determined by removing the error data from the error intermediate output 410.

It is assumed that the error intermediate output 410 may be represented as $Y'_1=f_1(X, W_1+r_1)$, where $f_1(\ )$ represents the transformation operation of the network layer 122-1. The corrected intermediate output 412 may be represented as $Y_1=f_1(X, W_1)$ when it approximates to the correct intermediate output of the network layer 122-1. The determination of the corrected intermediate output 412 may be represented as given X, $W_1$, and $r_1$, how to determine $Y_1$. The basic principle of the correction is an inverse transformation of the operation of the network layer, and the error data to be applied to the correct intermediate output is determined in this process. The corrected intermediate output may be obtained by removing the error data from the error intermediate output. Depending on the transformation operation $f_1(\ )$ of the network layer 122-1, various correction methods may be applied to determine the error data and then to determine the corrected intermediate output 412. Such correction is conceivable by those skilled in the art.

To better understand the determination of the corrected intermediate output 412 (denoted as $Y_1$), it is assumed that the network layer 122-1 is a convolutional layer and performs a convolution operation on its input. For the convolutional layer, the error intermediate output 410 may be determined as $Y'_1=X*(W_1+r_1)$, and the corrected intermediate output 412 (i.e., "$X*W_1$") may be determined as $Y'_1-X*r_1$, as marked on the correction module 402 in FIG. 4.

After being determined, the corrected intermediate output 412 is provided as an input to the network layer 122-2. The network layer 122-2 follows the network layer 122-1. In the TEE 220, the operation of the network layer 122-2 is performed based on the corrected intermediate output 412 and the set of parameter values $W_2$ of the network layer 122-2, to obtain the intermediate output 414 (as represented as $Y_2$). Since the set of parameter values $W_2$ are correct and unmodified parameter values of the network layer 122-2, and the corrected intermediate output 412 is also approximate to the correct intermediate output of the previous network layer 122-1, the intermediate output 414 may be considered as a correct intermediate output of the network layer 122-2.

The intermediate output 414 may be further used for processing in a following network layer 122 (if any) to determine the network output 140. In some implementations, if there is a network layer 122-3 following the network layer 122-2 and the network layer 122-3 is deployed in the uTEE 210, the input of the network layer 122-3 is provided from the TEE 220 to the uTEE 210. In some implementations, the intermediate output 414 may be directly provided to the network layer 122-3 as an input to the network layer. In this case, although the correct intermediate output is exposed to the uTEE 210, if the network layer 122-2 in the TEE 220 performs nonlinear transformation, it is usually difficult to derive the set of parameter values of the network layer 122-2 from the intermediate output 410, for example, by means of reverse engineering.

In some implementations, to further prevent the set of corrected parameter values of the machine learning network 120 from being leaked out, the TEE 220 further includes an intermediate output protection module 404, which is configured to modify the intermediate output of the network layer 122 executed in the TEE 220 (for example, the intermediate output 414 of the network layer 122-3) to hide the correct intermediate output from the uTEE 210. In some implementations, if the network layer 122 executed in the TEE 220 does not include the operation of non-linear transformation, especially if the input of the previous network layer 122 executed in the uTEE 220 (for example, the input of the network layer 122-1) is not scrambled, such modification is helpful for further confidentiality protection. Otherwise, a malicious party or an attacker may be able to derive the parameters of the network layer from the input of the previous network layer and the unprotected intermediate output.

In some implementations, some sensitive intermediate outputs generated in the TEE 220 may be protected. Sensitive intermediate outputs may include those intermediate outputs that can be easily used to derive the set of parameter values of the corresponding network layer. For example, assuming that the set of parameter values the network layer l is $W_1$, the intermediate output of the network layer is represented as $Y_1=f_1(X_1, W_1)$. If $f_1(\ )$ is a ReLu function, i.e., $f_1(x)=\max\{x, 0\}$, then when the intermediate output $X_1*W_1$ of the network layer l is a value greater than zero, the malicious party may derive the set of parameter values $W_1$ from such an intermediate output. Therefore, in some implementations, if an intermediate output has a non-zero value, such an intermediate output may be considered as being sensitive. The intermediate output protection module 404 is used to modify the sensitive intermediate output, to prevent it from being exposed to the uTEE 210.

In protecting the intermediate output 414, the intermediate output protection module 404 may modify the intermediate output 414 $Y_2$ based on additional secret data 405 (represented as e), to obtain an error intermediate output 416 (represented as $Y'_2$). The secret data 405 e may be a random value. The secret data 405 may be provided by the service provider 110 and stored in the protected memory area of the TEE 220. The error intermediate output 416 $Y'_2$ may be determined as $Y'_2=f_2(Y_1, W_2)+e$, where $f_2(Y_1, W_2)$ is the intermediate output 414 $Y_2$ after the network layer 122-2 performs the operation $f_2(\ )$.

In some implementations, although not illustrated in the example of FIG. 4, if intermediate outputs of a plurality of network layers 122 are needed to be modified in the TEE 220, the secret data e used for each of the network layers 122 may be different. Certainly, in some implementations, the same secret data e may be utilized to modify the intermediate outputs of the plurality of network layers 122 to obtain corresponding error intermediate outputs.

The error intermediate output 416 $Y'_2$ is provided to the uTEE 210 as an input to the next network layer 122-3. Therefore, from the perspective of the network layer 122-3, its input comes from the previous network layer 122-2 executed in the TEE 220. Unlike the network layer 122-1, the input of the network layer 122-3 has an error. The computing device 150 performs the operation of the network layer 122-3 in the uTEE 210 based on the input of the network layer 122-3 (i.e., the error intermediate output 416 $Y'_2$) and the set of modified parameter values $W_3+r_3$. Since both the parameter values and the input are incorrect, the output obtained from the execution of the network layer 122-3 is an error intermediate output 418 (represented as $Y'_3$).

In some implementations, if the machine learning network 120 includes a further network layer 122 after the network layer 122-3 and this network layer is deployed in the TEE 220, similar to the processing of the error intermediate output 410, the error intermediate output 418 may also be transferred to the TEE 220 and corrected in the TEE 220 for use to perform the operation of the next network layer 122.

In some implementations, if one or more of the network layers 122 following the network layer 122-3, including the network layer that provides the network output 140 (for example, the network layer 122-6), are all deployed in the uTEE 210, and the sets of parameter values of these following network layers 122 are all not modified (as shown in the example of FIG. 4), the computing device 150 transfers the error intermediate output 418 to the TEE 220 for correction, to obtain an correct intermediate output for the processing of these following network layers.

Reference is first made to FIG. 4 to describe the correction of the error intermediate output 418 in the TEE 220. The TEE 220 includes a correction module 406, which is configured to correct the error intermediate output 418 $Y'_3$ to obtain a corrected intermediate output 419 (represented as "$Y_3$"). The corrected intermediate output 412 may be determined as being the same as a correct intermediate output obtained by executing the operation of the network layer 122-3 using the set of correct parameter values $W_3$ of the network layer 122-3 and the correct network input (e.g., the correct intermediate output 414 $Y_2$ of the network layer 122-2).

Different from the error intermediate output 410, the error in the error intermediate output 418 is not only introduced by the set of modified parameter values $W_3+r_3$, but also by the input of the network layer 122-3 (i.e., the error intermediate output 416). Therefore, to correct the error intermediate output 418 $Y'_3$, the correction module 406 not only utilizes the input of the network layer 122-3 (i.e., the error intermediate output 416 $Y'_2$), the secret data 205-2 $r_3$ used in modifying the set of parameter values $W_3$ of the network layer 122-3, but also utilizes the set of correct parameter values $W_3$ of the network layer 122-3 and the secret data 405 e used in generating the error intermediate output 418.

It is assumed that the error intermediate output 418 may be represented as $Y'_3=f_3(Y'_2, W_3+r_3)$, where $f_3(\ )$ represents the transformation operation of the network layer 122-3. The corrected intermediate output 419 may be represented as $Y_3=f_3(Y_2, W_3)$ when it approximates to the correct intermediate output of the network layer 122-3. The determination of the corrected intermediate output 412 may be represented as given $Y'_2$, e, $W_3$, $r_3$, how to determine $Y_3$.

As mentioned above, the basic principle of correction is the inverse transformation of the operation of the network layer, and the error data applied to the correct intermediate output is determined during the process. The corrected intermediate output may be obtained by removing the error data from the error intermediate output. When the error intermediate output 418 $Y'_3$ is corrected, the correction module 406 may recover the intermediate output 414 $Y_2$ from the input of the network layer 122-3 (i.e., the error intermediate output 416 $Y'_2$) with the secret data 405 e. For example, the intermediate output 414 $Y_2$ is determined to be $Y_2=Y'_2-e$. In some implementations, the intermediate output 414 $Y_2$ of the network layer 122-2 may be buffered in the TEE 220. The intermediate output 414 $Y_2$ may be considered as the correct input to the network layer 122-3. The correction module 406 may determine the error data for the error intermediate output 418 $Y'_3$ based on the intermediate output 414 $Y_2$ and the secret data 205-2 $r_3$. This part of error data is introduced as the parameter values are modified. The correction module 406 may further determine additional error data for the error intermediate output 418 $Y'_3$ based on the set of parameter values $W_3$ of the network layer 122-3, the secret data 405 e and the secret data 205-2 $r_3$. This portion of error data is introduced mainly due to the error intermediate output 416 $Y'_2$. The correction module 406 may determine the corrected intermediate output 419 (represented as $Y_3$) of the network layer 122-3 by removing the two portions of error data from the error intermediate output 418 $Y'_3$.

To better understand the determination of the corrected intermediate output 419 $Y_3$, it is assumed that the network layer 122-3 is a convolutional layer and performs a convolution operation on the input. For the convolutional layer, the error intermediate output 418 may be determined as $Y'_3=Y'_2*(W_3+r_3)$, and the corrected intermediate output 419 (i.e., $Y_3=Y_2*W_3$) may be determined as $Y'_2-(Y'_2-e)*r_3-u_3$, as marked on the correction module 406 in FIG. 4. $(Y'_2-e)*r_3$ represents the error data introduced as the parameter values are modified. $u_3$ represents error data 420 which is introduced due to the error intermediate output 416 $Y'_2$, and may be determined as $u_3=(W_3+r_3)*e$.

After the corrected intermediate output 419 $Y_3$ is determined, the corrected intermediate output 419 $Y_3$ is provided to the next network layer 122-4. Since the corrected intermediate output 419 $Y_3$ is correct, and the sets $W_4$, $W_5$ and $W_6$ of parameter values of the network layers 122-4, 122-5 and the following network layer 122-6 are also correct, the network layer output 140 from the network layer 122-6 is also correct. It is noted that although the correct intermediate output and the set of parameter values are exposed in the uTEE 210 starting from the network layer 122-4, it is difficult for a malicious party to derive the entire machine learning network 120 from the processing of the network layers 122-4 to 122-6 after the processing of a plurality of their previous network layers has been performed and the sets of parameter values and intermediate outputs of those previous network layers are all protected.

In some implementations, although not shown in FIG. 4, if one or more network layers 122 following the network layer 122-3 have a set of modified parameter values, the computing device 150 continues to execute the operations of these network layers in the uTEE 210. In some implementations, the error intermediate output obtained from the last network layer 122 having the set of modified parameter values is provided to the TEE 220 to determine the corresponding corrected intermediate output used for determining the network output 140. In some implementations, the error intermediate output of the network layer 122-6 may also be provided to the TEE 220 for determining the corresponding corrected intermediate output. The corrected intermediate output determined here is provided as the correct network output 140.

In some implementations, the network layer that provides the network output 140 (e.g., the network layer 122-6) may be deployed in the TEE 220 for execution. In some implementations, one or more network layers preceding the network layer 122-6, such as the network layers 122-4 and 122-5, may also be deployed into the TEE 220 for execution. The uTEE 210 and the TEE 220 may interact with each other to determine that the input provided to the network layer 122-6 is a correct intermediate output from the previous network layer 122-5.

It should be appreciated that the network architecture of the machine learning network 120 and the deployment manner in the uTEE 210 and the TEE 220 illustrated in FIG. 4 are only examples. The machine learning network 120 may have more or fewer network layers than those illustrated in FIG. 4. The network layers deployed in the uTEE 210 or the TEE 220 may be more or less. The interactions and corrections between the uTEE 210 and the TEE 220 may guarantee that the correct network output 140 can be obtained.

Although one or more network layers are deployed in the TEE 220 in the above discussion, in other implementations, no operation of the network layers are performed in the TEE 220, and instead, the TEE 220 may be used for correction to obtain the correct intermediate output or network output. Such a deployment is feasible and beneficial, for example, when the architecture of the machine learning network is relatively simple. For example, in the example of FIG. 4, the network layer 122-2 may be deployed and executed in the uTEE 210. The error intermediate output of the network layer 122-3 is provided to the TEE 220, and after the correction module 406 determines the corrected intermediate output 419, the corrected intermediate output is then provided to the network layer 122-4 in the uTEE 210 to generate the final network output 140. In such an implementation, the secret data 405 may not be needed in the correction of the correction module 406.

Figure 5:
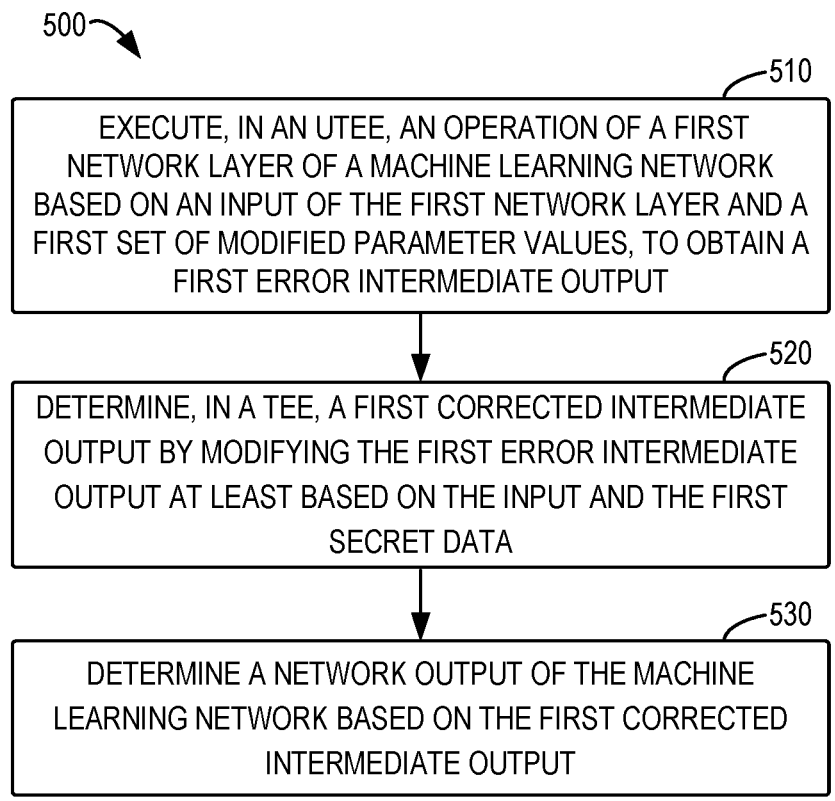
FIG. 5 illustrates a flowchart of a process according to some implementations of the subject matter described herein.

FIG. 5 illustrates a flowchart of a process 500 in accordance with some implementations of the subject matter described herein. The process 500 may be implemented by the computing device 150.

At block 510, the computing device 150 executes, in an uTEE, an operation of a first network layer of a machine learning network based on an input of the first network layer and a first set of modified parameter values, to obtain a first error intermediate output. The first set of modified parameter values are determined by modifying at least one subset of a first set of parameter values of the first network layer with first secret data. At block 520, the computing device 150 determines, in a TEE, a first corrected intermediate output by modifying the first error intermediate output at least based on the input and the first secret data. At block 530, the computing device 150 determines a network output of the machine learning network based on the first corrected intermediate output.

In some implementations, the first network layer meets at least one of the following conditions: the operation of the first network layer comprise linear transformation, a storage size of the first set of parameter values exceeds a storage threshold, and a computational resource required by execution of the operation of the first network layer exceeds a resource threshold.

In some implementations, a distribution of parameter values in the first set of modified parameter values is the same as a distribution of parameter values in the first set of parameter values. In some implementations, a contribution made by parameter values in the at least one subset of the first set of parameter values to the machine learning network is greater than a contribution made by other parameter values in the first set of parameter values to the machine learning network.

In some implementations, the first secret data is stored in a memory area of the TEE.

In some implementations, the machine learning network comprises a second network layer connected to and following the first network layer, and determining the network output of the machine learning network comprises: executing, in the TEE, an operation of the second network layer based on the first corrected intermediate output and a second set of parameter values of the second network layer of the machine learning network, to obtain a second intermediate output; and determining the network output of the machine learning network based on the second intermediate output.

In some implementations, wherein the second network layer meets at least one of the following conditions: the operation of the second network layer comprising non-linear transformation, a storage size of the second set of parameter values being below a storage threshold, and a computational resource required by execution of the operation of the second network layer being lower than a resource threshold.

In some implementations, the machine learning network comprises a third network layer connected to and preceding the first network layer, the process 500 further comprises: executing, in the TEE, an operation of the third network layer based on a third set of parameter values of the third network layer, to obtain a third intermediate output; and modifying, in the TEE, the third intermediate output with second secret data to obtain a third error intermediate output as the input.

In some implementations, determining the first corrected intermediate output comprises: determining, in the TEE, the first corrected intermediate output by modifying the first error intermediate output based on the input, the first secret data, the first set of parameter values, and the second secret data.

In some implementations, determining the first corrected intermediate output by modifying the first error intermediate output based on the input, the first secret data, the first set of parameter values, and the second secret data comprises: recovering the third intermediate output from the input using the second secret data; determining first error data based on the third intermediate output and the first secret data; determining second error data based on the first set of parameter values, the first secret data, and the second secret data; and determining the first corrected intermediate output by removing the first and second error data from the first error intermediate output.

In some implementations, the input is a network input of the machine learning network. In some implementations, determining the first corrected intermediate output comprises: determining, in the TEE, third error data based on the first secret data and the input; and determining, in the TEE, the first corrected intermediate output by removing the third error data from the first error intermediate output.

In some implementations, the machine learning network comprises a fourth network layer following the first network layer, and determining a network output of the machine learning network comprises: executing, in the TEE or the uTEE, an operation of the fourth network layer based on the first corrected intermediate output and a fourth set of parameter values of the fourth network layer, to obtain the network output of the machine learning network.

Figure 6:
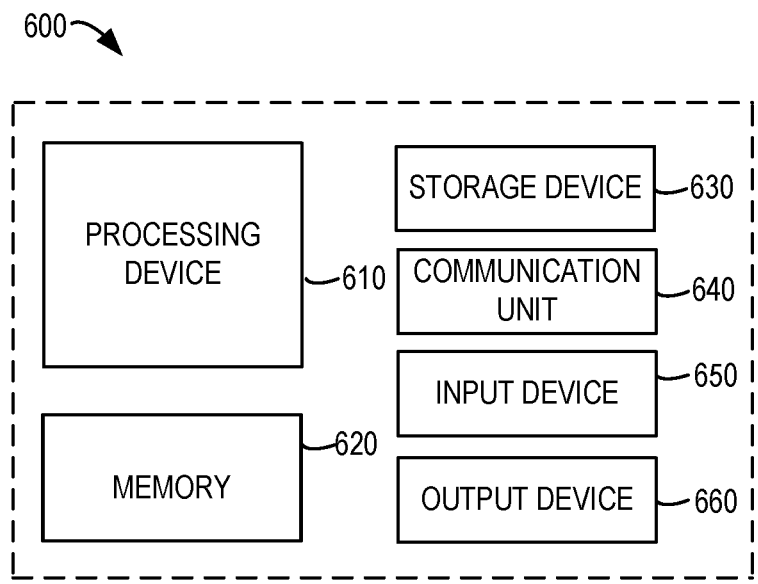
FIG. 6 illustrates a block diagram of a computing device that are suitable for the implementations of the subject matter described herein.

FIG. 6 illustrates a structure of a computing device 600. The computing device 600 may be used to implement the computing device 150 in FIG. 1, and to implement execution of the machine learning network in various implementations of the subject matter described herein.

As shown, components of the computing device 100 can include, but are not limited to, one or more processors or processing units 610, a memory 620, a storage device 630, one or more communication units 640, one or more input devices 650, and one or more output devices 660. It should be appreciated that the computing device 600 is merely provided as an example, without suggesting any limitation to the functionalities and scope of implementations of the subject matter described herein.

In some implementations, the computing device 600 may be implemented as various terminals or devices having a computing capability. For example, the computing device 600 may be a cloud computing device, an edge server, a large-scale computing system, and the like. The computing device 600 may also be other devices having a computing capability, and may even be a mobile terminal, a fixed terminal, or a portable terminal.

The processor 610 can be a physical or virtual processor and can implement various processes based on programs stored in the memory 620. In a multi-processor system, multiple processors execute computer-executable instructions in parallel to improve the parallel processing capability of the computing device 600. The processor 610 may also be referred to as a central processing unit (CPU), a microprocessor, a controller, or a microcontroller.

The computing device 600 usually includes various computer storage medium. The computer storage medium may be any available medium accessible by the computing device 600, including but not limited to, volatile and non-volatile medium, or detachable and non-detachable medium. The memory 620 may be a volatile memory (e.g., a register, cache, a cache, Random Access Memory (RAM)), non-volatile memory (e.g., a Read-Only Memory (ROM), Electrically Erasable Programmable Read-Only Memory (EEPROM), flash memory), or any combination thereof. The storage device 630 may be any detachable or non-detachable medium and may include machine-readable medium such as a memory, a flash drive, a magnetic disk, or any other medium, which can be used for storing information and/or data and are accessible by the computing device 600.

The computing device 600 may further include additional detachable/non-detachable, volatile/non-volatile memory medium. Although not shown in FIG. 6, it is possible to provide a disk drive for reading from or writing into a detachable and non-volatile disk, and an optical disk drive for reading from and writing into a detachable non-volatile optical disc. In such case, each drive may be connected to a bus (not shown) via one or more data medium interfaces.

The communication unit 640 communicates with a further computing device via the communication medium. In addition, the functions of components in the computing device 600 may be implemented by a single computing cluster or multiple computing machines that can communicate with each other via communication connections. Therefore, the computing device 600 can operate in a networked environment using logic connections with one or more other servers, network personal computers (PCs), or further general network nodes.

The input device 650 may include one or more of various input devices such as a mouse, keyboard, tracking ball, voice-input device, and the like. The output device 660 may include one or more of various output devices such as a display, loudspeaker, printer, and the like. By means of the communication unit 640, the computing device 600 can further communicate with one or more external devices (not shown) such as storage devices and display devices, one or more devices that enable the user to interact with the computing device 600, or any devices (such as a network card, a modem and the like) that enable the computing device 600 to communicate with one or more other computing devices, if required. Such communication may be performed via input/output (I/O) interfaces (not shown).

Some example implementations of the subject matter described herein are listed below.

In an aspect, the subject matter described herein provides a computer-implemented method. The method comprises: in an untrusted execution environment (uTEE) of a computing device, executing an operation of a first network layer of a machine learning network based on an input of the first network layer and a first set of modified parameter values, to obtain a first error intermediate output, the first set of modified parameter values being determined by modifying at least one subset of a first set of parameter values of the first network layer with first secret data; in a trusted execution environment (TEE) of the computing device, determining a first corrected intermediate output by modifying the first error intermediate output at least based on the input and the first secret data; and determining a network output of the machine learning network based on the first corrected intermediate output.

In some implementations, the first network layer meets at least one of the following conditions: the operation of the first network layer comprise linear transformation, a storage size of the first set of parameter values exceeds a storage threshold, and a computational resource required by execution of the operation of the first network layer exceeds a resource threshold.

In some implementations, a distribution of parameter values in the first set of modified parameter values is the same as a distribution of parameter values in the first set of parameter values. In some implementations, a contribution made by parameter values in the at least one subset of the first set of parameter values to the machine learning network is greater than a contribution made by other parameter values in the first set of parameter values to the machine learning network.

In some implementations, the first secret data is stored in a memory area of the TEE.

In some implementations, the machine learning network comprises a second network layer connected to and following the first network layer, and determining the network output of the machine learning network comprises: executing, in the TEE, an operation of the second network layer based on the first corrected intermediate output and a second set of parameter values of the second network layer of the machine learning network, to obtain a second intermediate output; and determining the network output of the machine learning network based on the second intermediate output.

In some implementations, wherein the second network layer meets at least one of the following conditions: the operation of the second network layer comprising non-linear transformation, a storage size of the second set of parameter values being below a storage threshold, and a computational resource required by execution of the operation of the second network layer being lower than a resource threshold.

In some implementations, the machine learning network comprises a third network layer connected to and preceding the first network layer, the method further comprises: executing, in the TEE, an operation of the third network layer based on a third set of parameter values of the third network layer, to obtain a third intermediate output; and modifying, in the TEE, the third intermediate output with second secret data to obtain a third error intermediate output as the input.

In some implementations, determining the first corrected intermediate output comprises: determining, in the TEE, the first corrected intermediate output by modifying the first error intermediate output based on the input, the first secret data, the first set of parameter values, and the second secret data.

In some implementations, determining the first corrected intermediate output by modifying the first error intermediate output based on the input, the first secret data, the first set of parameter values, and the second secret data comprises: recovering the third intermediate output from the input using the second secret data; determining first error data based on the third intermediate output and the first secret data; determining second error data based on the first set of parameter values, the first secret data, and the second secret data; and determining the first corrected intermediate output by removing the first and second error data from the first error intermediate output.

In some implementations, the input is a network input of the machine learning network. In some implementations, determining the first corrected intermediate output comprises: determining, in the TEE, third error data based on the first secret data and the input; and determining, in the TEE, the first corrected intermediate output by removing the third error data from the first error intermediate output.

In some implementations, the machine learning network comprises a fourth network layer following the first network layer. In some implementations, determining a network output of the machine learning network comprises: executing, in the TEE or the uTEE, an operation of the fourth network layer based on the first corrected intermediate output and a fourth set of parameter values of the fourth network layer, to obtain the network output of the machine learning network.

In another aspect, the subject matter described herein provides an electronic device. The electronic device comprises: a processor; and a memory coupled to the processor and comprising instructions stored thereon which, when executed by the processor, cause the device to perform acts of: in an untrusted execution environment (uTEE) of a computing device, executing an operation of a first network layer of a machine learning network based on an input of the first network layer and a first set of modified parameter values, to obtain a first error intermediate output, the first set of modified parameter values being determined by modifying at least one subset of a first set of parameter values of the first network layer with first secret data; in a trusted execution environment (TEE) of the computing device, determining a first corrected intermediate output by modifying the first error intermediate output at least based on the input and the first secret data; and determining a network output of the machine learning network based on the first corrected intermediate output.

In some implementations, the first network layer meets at least one of the following conditions: the operation of the first network layer comprise linear transformation, a storage size of the first set of parameter values exceeds a storage threshold, and a computational resource required by execution of the operation of the first network layer exceeds a resource threshold.

In some implementations, a distribution of parameter values in the first set of modified parameter values is the same as a distribution of parameter values in the first set of parameter values. In some implementations, a contribution made by parameter values in the at least one subset of the first set of parameter values to the machine learning network is greater than a contribution made by other parameter values in the first set of parameter values to the machine learning network.

In some implementations, the first secret data is stored in a memory area of the TEE.

In some implementations, the machine learning network comprises a second network layer connected to and following the first network layer, and determining the network output of the machine learning network comprises: executing, in the TEE, an operation of the second network layer based on the first corrected intermediate output and a second set of parameter values of the second network layer of the machine learning network, to obtain a second intermediate output; and determining the network output of the machine learning network based on the second intermediate output.

In some implementations, wherein the second network layer meets at least one of the following conditions: the operation of the second network layer comprising non-linear transformation, a storage size of the second set of parameter values being below a storage threshold, and a computational resource required by execution of the operation of the second network layer being lower than a resource threshold.

In some implementations, the machine learning network comprises a third network layer connected to and preceding the first network layer, the method further comprises: executing, in the TEE, an operation of the third network layer based on a third set of parameter values of the third network layer, to obtain a third intermediate output; and modifying, in the TEE, the third intermediate output with second secret data to obtain a third error intermediate output as the input.

In some implementations, determining the first corrected intermediate output comprises: determining, in the TEE, the first corrected intermediate output by modifying the first error intermediate output based on the input, the first secret data, the first set of parameter values, and the second secret data.

In some implementations, determining the first corrected intermediate output by modifying the first error intermediate output based on the input, the first secret data, the first set of parameter values, and the second secret data comprises: recovering the third intermediate output from the input using the second secret data; determining first error data based on the third intermediate output and the first secret data; determining second error data based on the first set of parameter values, the first secret data, and the second secret data; and determining the first corrected intermediate output by removing the first and second error data from the first error intermediate output.

In some implementations, the input is a network input of the machine learning network. In some implementations, determining the first corrected intermediate output comprises: determining, in the TEE, third error data based on the first secret data and the input; and determining, in the TEE, the first corrected intermediate output by removing the third error data from the first error intermediate output.

In some implementations, the machine learning network comprises a fourth network layer following the first network layer. In some implementations, determining a network output of the machine learning network comprises: executing, in the TEE or the uTEE, an operation of the fourth network layer based on the first corrected intermediate output and a fourth set of parameter values of the fourth network layer, to obtain the network output of the machine learning network.

In another aspect, the subject matter described herein provides a computer program product tangibly stored in a computer storage medium and comprising computer-executable instructions, the computer-executable instructions, when executed by a device, causing the device to perform the method in the above aspects.

In a further aspect, the subject matter described herein provides a computer readable medium having machine-executable instructions stored thereon, the machine-executable instructions, when executed by a device, causing the device to perform the method in the above aspects.

The functionalities described herein can be performed, at least in part, by one or more hardware logic components. For example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be appreciated as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be appreciated that the subject matter specified in the appended claims is not necessarily limited to the specific features or acts described above. Rather, the specific features and acts described above are disclosed as example forms of implementing the claims.

The invention claimed is:

1. A computer-implemented method comprising:
in an untrusted execution environment (uTEE) of a computing device, executing an operation of a first network layer of a machine learning network based on an input of the first network layer and a first set of modified parameter values, to obtain a first error intermediate output, the first set of modified parameter values being determined by modifying at least one subset of a first set of parameter values of the first network layer with first secret data, wherein:
 a distribution of parameter values in the first set of modified parameter values is the same as a distribution of parameter values in the first set of parameter values; or
 a contribution made by parameter values in the at least one subset of the first set of parameter values to the machine learning network is greater than a contribution made by other parameter values in the first set of parameter values to the machine learning network;
in a trusted execution environment (TEE) of the computing device, determining a first corrected intermediate output by modifying the first error intermediate output at least based on the input and the first secret data; and
determining a network output of the machine learning network based on the first corrected intermediate output.

2. The method of claim 1, wherein the first secret data is stored in a memory area of the TEE.

3. The method of claim 1, wherein the machine learning network comprises a second network layer connected to and following the first network layer, and determining the network output of the machine learning network comprises:
executing, in the TEE, an operation of the second network layer based on the first corrected intermediate output and a second set of parameter values of the second network layer of the machine learning network, to obtain a second intermediate output; and
determining the network output of the machine learning network based on the second intermediate output.

4. The method of claim 3, wherein the second network layer meets at least one of the following conditions:
the operation of the second network layer comprising non-linear transformation,
a storage size of the second set of parameter values being below a storage threshold, and
a computational resource required by execution of the operation of the second network layer being lower than a resource threshold.

5. The method of claim 1, wherein the machine learning network comprises a third network layer connected to and preceding the first network layer, the method further comprising:
  executing, in the TEE, an operation of the third network layer based on a third set of parameter values of the third network layer, to obtain a third intermediate output; and
  modifying, in the TEE, the third intermediate output with second secret data to obtain a third error intermediate output as the input.

6. The method of claim 5, wherein determining the first corrected intermediate output comprises:
  determining, in the TEE, the first corrected intermediate output by modifying the first error intermediate output based on the input, the first secret data, the first set of parameter values, and the second secret data.

7. The method of claim 6, wherein determining the first corrected intermediate output by modifying the first error intermediate output based on the input, the first secret data, the first set of parameter values, and the second secret data comprises:
  recovering the third intermediate output from the input using the second secret data;
  determining first error data based on the third intermediate output and the first secret data;
  determining second error data based on the first set of parameter values, the first secret data, and the second secret data; and
  determining the first corrected intermediate output by removing the first and second error data from the first error intermediate output.

8. The method of claim 1, wherein the input is a network input of the machine learning network, and determining the first corrected intermediate output comprises:
  determining, in the TEE, third error data based on the first secret data and the input; and
  determining, in the TEE, the first corrected intermediate output by removing the third error data from the first error intermediate output.

9. The method of claim 1, wherein the machine learning network comprises a fourth network layer following the first network layer, and determining a network output of the machine learning network comprises:
  executing, in the TEE or the uTEE, an operation of the fourth network layer based on the first corrected intermediate output and a fourth set of parameter values of the fourth network layer, to obtain the network output of the machine learning network.

10. An electronic device comprising:
  a processor; and
  a memory coupled to the processor and comprising instructions stored thereon which, when executed by the processor, cause the device to perform acts of:
  in an untrusted execution environment (uTEE) of a computing device, executing an operation of a first network layer of a machine learning network based on an input of the first network layer and a first set of modified parameter values, to obtain a first error intermediate output, the first set of modified parameter values being determined by modifying at least one subset of a first set of parameter values of the first network layer with first secret data, wherein:
    a distribution of parameter values in the first set of modified parameter values is the same as a distribution of parameter values in the first set of parameter values; or
    a contribution made by parameter values in the at least one subset of the first set of parameter values to the machine learning network is greater than a contribution made by other parameter values in the first set of parameter values to the machine learning network;
  in a trusted execution environment (TEE) of the computing device, determining a first corrected intermediate output by modifying the first error intermediate output at least based on the input and the first secret data; and
  determining a network output of the machine learning network based on the first corrected intermediate output.

11. The device of claim 10, wherein the machine learning network comprises a second network layer connected to and following the first network layer, and determining the network output of the machine learning network comprises:
  executing, in the TEE, an operation of the second network layer based on the first corrected intermediate output and a second set of parameter values of the second network layer of the machine learning network, to obtain a second intermediate output; and
  determining the network output of the machine learning network based on the second intermediate output.

12. The device of claim 10, wherein the machine learning network comprises a third network layer connected to and preceding the first network layer, the method further comprising:
  executing, in the TEE, an operation of the third network layer based on a third set of parameter values of the third network layer, to obtain a third intermediate output; and
  modifying, in the TEE, the third intermediate output with second secret data to obtain a third error intermediate output as the input.

13. A computer program product tangibly stored in a computer storage medium and comprising computer-executable instructions which, when executed by a device, cause the device to perform method operations comprising:
  executing, in an untrusted execution environment (uTEE) of a computing device, an operation of a first network layer of a machine learning network based on an input of the first network layer and a first set of modified parameter values, to obtain a first error intermediate output, the first set of modified parameter values being determined by modifying at least one subset of a first set of parameter values of the first network layer with first secret data, wherein:
    a distribution of parameter values in the first set of modified parameter values is the same as a distribution of parameter values in the first set of parameter values; or
    a contribution made by parameter values in the at least one subset of the first set of parameter values to the machine learning network is greater than a contribution made by other parameter values in the first set of parameter values to the machine learning network;
  determining, in a trusted execution environment (TEE) of the computing device, a first corrected intermediate output by modifying the first error intermediate output at least based on the input and the first secret data; and
  determining a network output of the machine learning network based on the first corrected intermediate output.

* * * * *